(12) United States Patent
Balasubramanian et al.

(10) Patent No.: US 11,706,678 B2
(45) Date of Patent: Jul. 18, 2023

(54) NETWORK EDGE CENTRALIZED LOCATION DETERMINATION

(71) Applicant: QUALCOMM Incorporated, San Diego, CA (US)

(72) Inventors: Anantharaman Balasubramanian, San Diego, CA (US); Kapil Gulati, Belle Mead, NJ (US); Saadallah Kassir, Austin, TX (US)

(73) Assignee: QUALCOMM INCORPORATED, San Diego, CA (US)

( * ) Notice: Subject to any disclaimer, the term of this patent is extended or adjusted under 35 U.S.C. 154(b) by 34 days.

(21) Appl. No.: 17/326,959

(22) Filed: May 21, 2021

(65) Prior Publication Data

US 2022/0377634 A1 Nov. 24, 2022

(51) Int. Cl.
*H04W 36/00* (2009.01)
*H04W 36/32* (2009.01)

(52) U.S. Cl.
CPC ....... *H04W 36/03* (2018.08); *H04W 36/0058* (2018.08); *H04W 36/00837* (2018.08); *H04W 36/32* (2013.01)

(58) Field of Classification Search
CPC ... G08G 1/20; G01S 19/40; G01S 2013/9325; H04W 36/03; H04W 36/00837; H04W 36/0058; H04W 36/32; H04W 4/08; H04W 4/40; H04W 4/44; H04W 4/46; H04W 4/20; H04W 4/02
See application file for complete search history.

(56) References Cited

U.S. PATENT DOCUMENTS

| 2009/0264137 | A1  | 10/2009 | Soliman |
| 2019/0394695 | A1* | 12/2019 | Mueck ............... H04W 4/44 |
| 2020/0130711 | A1* | 4/2020  | Turek ............... B60W 60/0016 |
| 2022/0066469 | A1* | 3/2022  | Ghannam ........ G06Q 10/06312 |
| 2022/0191819 | A1* | 6/2022  | Ratasuk ............ H04W 4/029 |

OTHER PUBLICATIONS

International Search Report and Written Opinion—PCT/US2022/024770—ISA/EPO—dated Aug. 3, 2022.

* cited by examiner

*Primary Examiner* — Quoc Thai N Vu
(74) *Attorney, Agent, or Firm* — Sunstein LLP

(57) ABSTRACT

A method for centralized device tracking includes: obtaining, at a first UE from multiple sources, first multi-source position information corresponding to a second UE; determining, based on the first multi-source position information, second multi-source position information corresponding to the second UE; identifying a third UE, separate from the first UE, to which the second multi-source position information is relevant; and sending migration information to the third UE, the migration information comprising an identifier of the second UE and comprising the first multi-source position information, or the second multi-source position information, or a combination thereof.

28 Claims, 8 Drawing Sheets

NETWORK EDGE CENTRALIZED LOCATION DETERMINATION

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), a fifth-generation (5G) service, etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal Frequency Division Multiple Access (OFDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

In an embodiment, a method for centralized device tracking includes: obtaining, at a first user equipment (UE) from multiple sources, first multi-source position information corresponding to a second UE; determining, based on the first multi-source position information, second multi-source position information corresponding to the second UE; identifying a third UE, separate from the first UE, to which the second multi-source position information is relevant; and sending migration information to the third UE, the migration information comprising an identifier of the second UE and comprising the first multi-source position information, or the second multi-source position information, or a combination thereof.

In another embodiment, a first UE includes: a transceiver; a memory; and a processor communicatively coupled to the transceiver and the memory and configured to: obtain, from multiple sources, first multi-source position information corresponding to a second UE; determine, based on the first multi-source position information, second multi-source position information corresponding to the second UE; identify a third UE, separate from the first UE, to which the second multi-source position information is relevant; and send migration information to the third UE, the migration information comprising an identifier of the second UE and comprising the first multi-source position information, or the second multi-source position information, or a combination thereof.

In another embodiment, a first UE includes: means for obtaining, from multiple sources, first multi-source position information corresponding to a second UE; means for determining, based on the first multi-source position information, second multi-source position information corresponding to the second UE; means for identifying a third UE, separate from the first UE, to which the second multi-source position information is relevant; and means for sending migration information to the third UE, migration information comprising an identifier of the second UE and comprising the first multi-source position information, or the second multi-source position information, or a combination thereof.

In another embodiment, a non-transitory, processor-readable storage medium of a first UE includes processor-readable instructions to cause a processor of the first UE to: obtain, from multiple sources, first multi-source position information corresponding to a second UE; determine, based on the first multi-source position information, second multi-source position information corresponding to the second UE; identify a third UE, separate from the first UE, to which the second multi-source position information is relevant; and send migration information to the third UE, the migration information comprising an identifier of the second UE and comprising the first multi-source position information, or the second multi-source position information, or a combination thereof.

DETAILED DESCRIPTION

Figure 1:
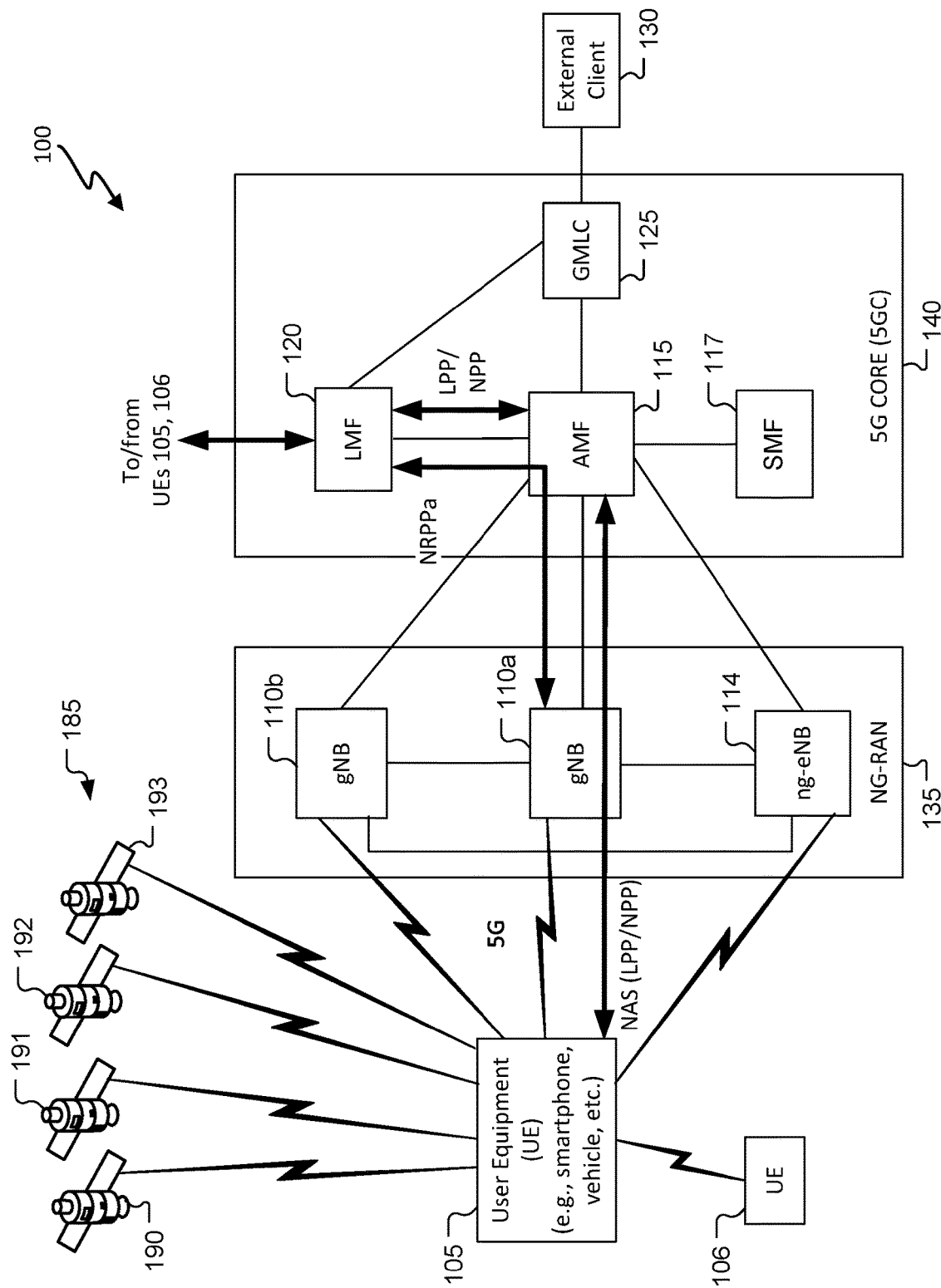
FIG. 1 is a simplified diagram of an example wireless communications system.

Techniques are discussed herein for providing adaptive centralized mobile object detection at the network edge. For example, multiple vehicle user equipments (VUEs) may share information regarding ranging to one or more objects such as vulnerable road user (VRU) UEs which are UEs associated with VRUs, with VRUs being entities such as pedestrians, bicyclists, etc. The VUEs may selectively opt into a centralized system, with each one or more of the VUEs being configured to process position information (e.g., measurements, ranges, position estimates) from multiple sources (e.g., the VUE itself and/or one or more other UEs) to determine locations of VRU UEs. Each of the VUEs may host a respective virtual machine (VM) to determine the locations of the VRU UEs. A central VUE determining multi-source position information (e.g., hosting a VM) may determine one or more other VUEs with which to share information to determine multi-source position information (e.g., to share the VM). A central VUE may identify one or more other VUEs with whom to share information (e.g., migrate the VM). A central VUE may share the information to provide a backup and/or may share the information based on the central VUE losing relevance to the information (e.g., losing relevance to a location and/or one or more VRU UE(s) associated with the information). Receiving VUEs and/or receiving VRU UEs may receive information regarding VUEs and/or VRU UEs and determine appropriate actions, e.g., to avoid collisions. The receiving VUEs and/or receiving VRU UEs may assess position information received from a centralized source (e.g., the central VUE determining the multi-source position information) and may weight position information from the centralized source relative to position information determined locally by the receiving VUE or receiving VRU UE, and may weight the position information types differently based on one or more criteria such as a present location of the receiving VUE or receiving VRU UE, a present density of other UEs near the receiving VUE or receiving VRU UE, etc. These are examples, and other examples may be implemented.

Items and/or techniques described herein may provide one or more of the following capabilities, as well as other capabilities not mentioned. Centralized position/motion detection for objects may be implemented without a fixed infrastructure. Infrastructure for centralized position/motion detection of objects may be established and de-established on demand. Infrastructure costs may be reduced while object position/motion detection, e.g., for collision avoidance, is/are performed. On-demand centralized position/motion detection of objects may be provided in close proximity to areas of high object density. High-accuracy object location/motion detection may be provided by sharing ranging information between objects and multiple measurement devices, e.g., VUEs. Driving safety may be improved, saving lives. Centralized tracking may be leveraged to use information from multiple sources for position determination and/or tracking. Other capabilities may be provided and not every implementation according to the disclosure must provide any, let alone all, of the capabilities discussed.

Obtaining the locations of mobile devices that are accessing a wireless network may be useful for many applications including, for example, emergency calls, personal navigation, consumer asset tracking, locating a friend or family member, etc. Existing positioning methods include methods based on measuring radio signals transmitted from a variety of devices or entities including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, consumer asset tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE 802.11, etc.) and so on.

A base station may operate according to one of several RATs in communication with UEs depending on the network in which it is deployed, and may be alternatively referred to as an Access Point (AP), a Network Node, a NodeB, an evolved NodeB (eNB), a general Node B (gNodeB, gNB), etc. In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN) 135, here a Fifth Generation (5G) Next Generation (NG) RAN (NG-RAN), and a 5G Core Network (5GC) 140. The UE 105 and/or the UE 106 may be, e.g., an IoT device, a location tracker device, a cellular telephone, a vehicle (e.g., a car, a truck, a bus, a boat, etc.), or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110a, 110b, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. The BSs 110a, 110b, 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®, Bluetooth®-low energy (BLE), Zigbee, etc. One or more of the BSs 110a, 110b, 114 may be configured to communicate with the UE 105 via multiple carriers. Each of the BSs 110a, 110b, 114 may provide communication coverage for a respective geographic region, e.g. a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although only one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110a, 110b are examples and may, in various embodiments, be replaced by or include various other location server functionality and/or base station functionality respectively.

The system 100 is capable of wireless communication in that components of the system 100 can communicate with one another (at least some times using wireless connections) directly or indirectly, e.g., via the BSs 110a, 110b, 114 and/or the network 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples only as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the BSs 110a, 110b, 114, the core network 140, and/or the external client 130. For example, such other devices may include internet of thing (IoT) devices, medical devices, home entertainment and/or automation devices, etc. The core network 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long-Term Evolution), V2X (Vehicle-to-Everything, e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH).

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110a, 110b, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110a and 110b. Pairs of the gNBs 110a, 110b in the NG-RAN 135 may be connected to one another via one or more other gNBs. Access to the 5G network is provided to the UE 105 via wireless communication between the UE 105 and one or more of the gNBs 110a, 110b, which may provide wireless communications access to the 5GC 140 on behalf of the UE 105 using 5G. In FIG. 1, the serving gNB for the UE 105 is assumed to be the gNB 110a, although another gNB (e.g. the gNB 110b) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110a, 110b in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110a, 110b and/or the ng-eNB 114 may be configured to function as positioning-only beacons which may transmit signals to assist with determining the position of the UE 105 but may not receive signals from the UE 105 or from other UEs.

The BSs 110*a*, 110*b*, 114 may each comprise one or more TRPs. For example, each sector within a cell of a BS may comprise a TRP, although multiple TRPs may share one or more components (e.g., share a processor but have separate antennas). The system 100 may include only macro TRPs or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110*a*, 110*b* and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the BSs 110*a*, 110*b*, 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round Trip Time (RTT), Multi-Cell RTT, Real Time Kinematics (RTK), Precise Point Positioning (PPP), Differential GNSS (DGNSS), Enhanced Cell ID (E-CID), angle of arrival (AoA), angle of departure (AoD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110*a*, 110*b* and/or the ng-eNB 114, and/or assistance data provided to the UE 105, e.g. by the LMF 120). The AMF 115 may serve as a control node that processes signaling between the UE 105 and the core network 140, and may provide QoS (Quality of Service) flow and session management. The AMF 115 may support mobility of the UE 105 including cell change and handover and may participate in supporting signaling connection to the UE 105.

The GMLC 125 may support a location request for the UE 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though only one of these connections may be supported by the 5GC 140 in some implementations.

As further illustrated in FIG. 1, the LMF 120 may communicate with the gNBs 110*a*, 110*b* and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110*a* (or the gNB 110*b*) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110*a*, 110*b* or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110*a*, 110*b* or the ng-eNB 114) and/or may be used by the LMF 120 to obtain location related information from the gNBs 110*a*, 110*b* and/or the ng-eNB 114, such as parameters defining directional SS transmissions from the gNBs 110*a*, 110*b*, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110a, 110b, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110a, 110b, the ng-eNB 114, or other base stations or APs).

With a network-based position method, one or more base stations (e.g., the gNBs 110a, 110b, and/or the ng-eNB 114) or APs may obtain location measurements (e.g., measurements of RSSI, RTT, RSRP, RSRQ or Time Of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110a, 110b, and/or the ng-eNB 114 to the LMF 120 using NRPPa may include timing and configuration information for directional SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110a, 110b, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110a (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 150. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS beams, sent by base stations (such as the gNBs 110a, 110b, and/or the ng-eNB 114) that are within range of the UE whose position is to be determined (e.g., the UE 105 of FIG. 1). The UE may, in some instances, use the directional SS beams from a plurality of base stations (such as the gNBs 110a, 110b, the ng-eNB 114, etc.) to compute the UE's position.

Figure 2:
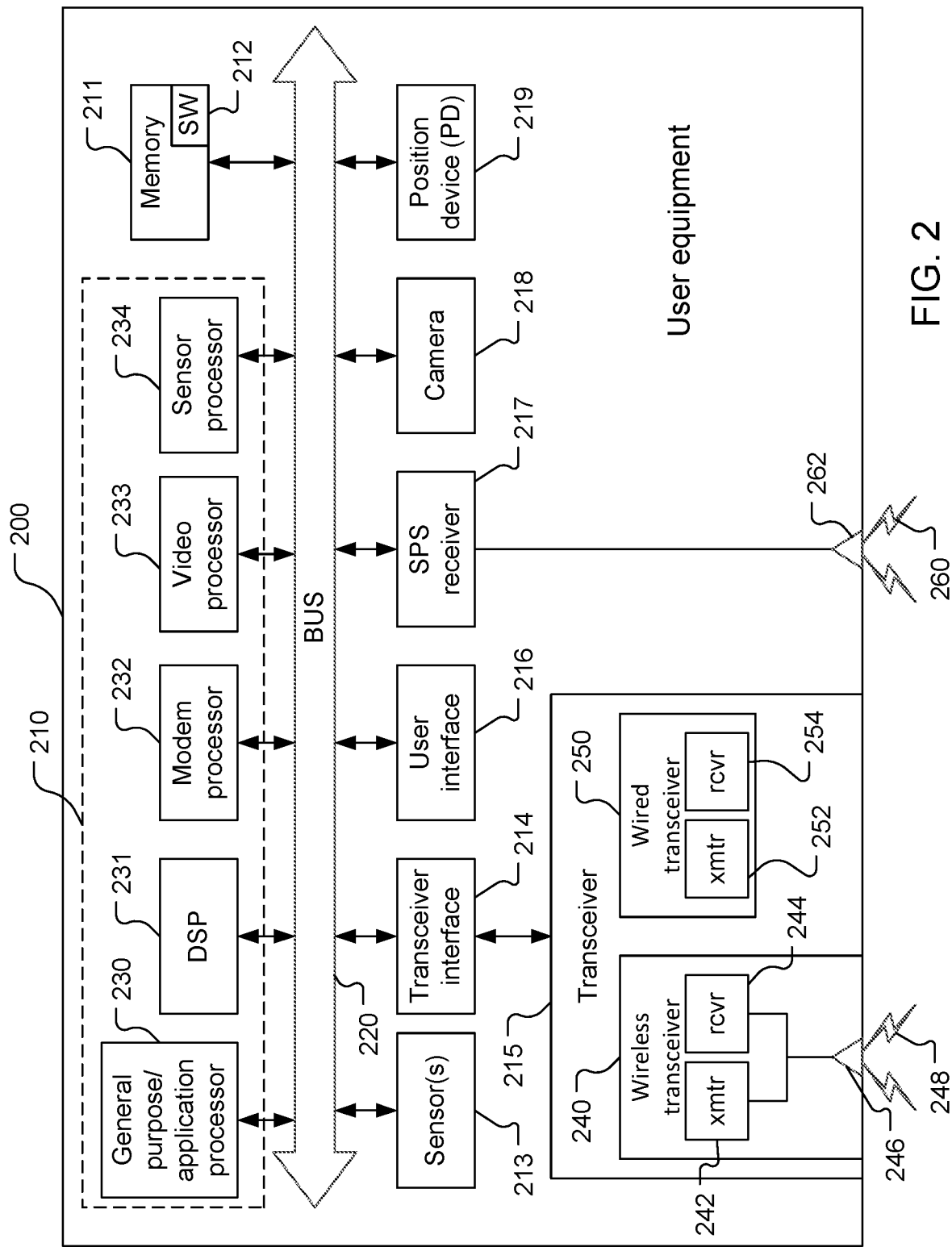
FIG. 2 is a block diagram of components of an example user equipment shown in FIG. 1.

Referring also to FIG. 2, a UE 200 is an example of one of the UEs 105, 106 and comprises a computing platform including a processor 210, memory 211 including software (SW) 212, one or more sensors 213, a transceiver interface 214 for a transceiver 215 (that includes a wireless transceiver 240 and a wired transceiver 250), a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/ application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more cellular wireless signals transmitted and reflection(s) used to identity, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer only to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, the wireless transceiver 240, and one or more of the sensor(s) 213, the user interface 216, the SPS receiver 217, the camera 218, the PD 219, and/or the wired transceiver 250.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the processor 230 and/or the DSP 231. Other configurations, however, may be used to perform baseband processing.

The UE 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 200 in three dimensions) and/or one or more gyroscopes (e.g., three-dimensional gyroscope(s)). The sensor(s) 213 may include one or more magnetometers (e.g., three-dimensional magnetometer(s)) to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU may be configured to provide measurements about a direction of motion and/or a speed of motion of the UE 200, which may be used in relative location determination. For example, one or more accelerometers and/or one or more gyroscopes of the IMU may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) and gyroscope(s) taken after this moment in time may be used in dead reckoning to determine present location of the UE 200 based on movement (direction and distance) of the UE 200 relative to the reference location.

The magnetometer(s) may determine magnetic field strengths in different directions which may be used to determine orientation of the UE 200. For example, the orientation may be used to provide a digital compass for the UE 200. The magnetometer(s) may include a two-dimensional magnetometer configured to detect and provide indications of magnetic field strength in two orthogonal dimensions. Alternatively, the magnetometer(s) may include a three-dimensional magnetometer configured to detect and provide indications of magnetic field strength in three orthogonal dimensions. The magnetometer(s) may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to one or more antennas 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 250 may include a wired transmitter 252 and a wired receiver 254 configured for wired communication, e.g., with the network 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The antenna 262 is configured to transduce the wireless signals 260 to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer only to the PD 219 being configured to perform, or performing, in accordance with the positioning method(s). The PD 219 may also or alternatively be configured to determine location of the UE 200 using terrestrial-based signals (e.g., at least some of the signals 248) for trilateration, for assistance with obtaining and using the SPS signals 260, or both. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion. Functionality of the PD 219 may be provided in a variety of manners and/or configurations, e.g., by the general purpose/application processor 230, the transceiver 215, the SPS receiver 262, and/or another component of the UE 200, and may be provided by hardware, software, firmware, or various combinations thereof.

Figure 3:
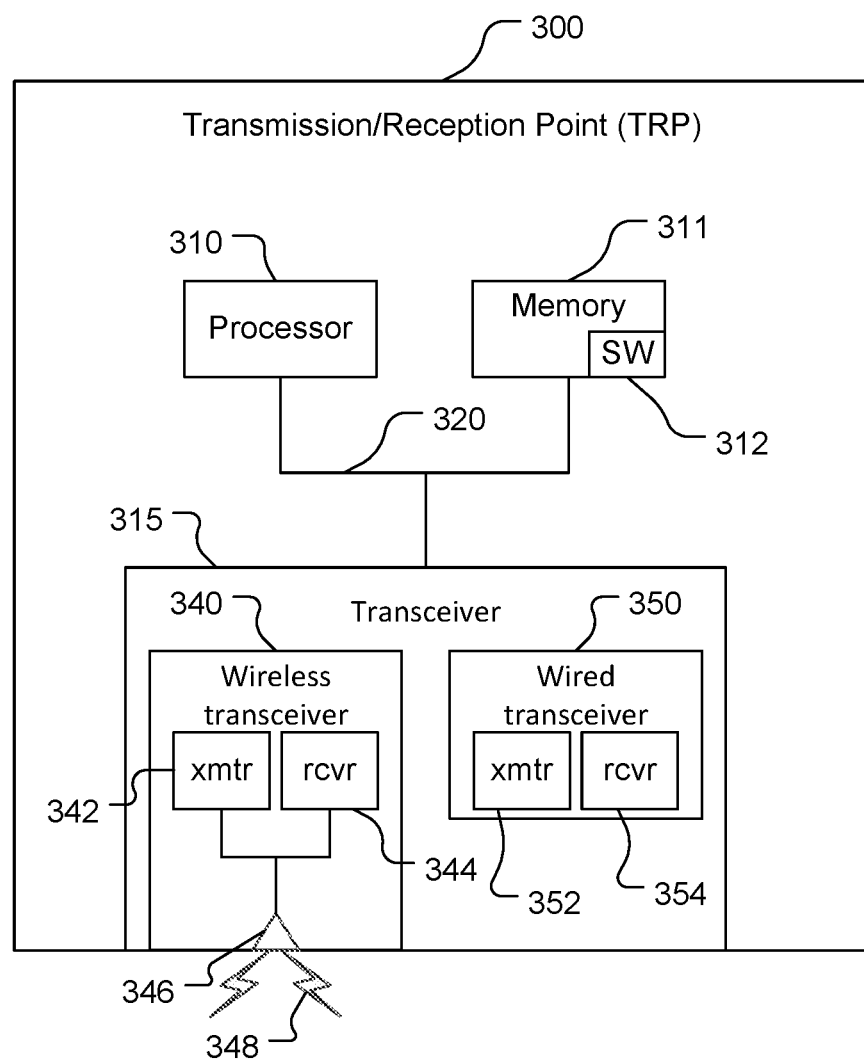
FIG. 3 is a block diagram of components of an example transmission/reception point.

Referring also to FIG. 3, an example of a TRP 300 of the BSs 110a, 110b, 114 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless interface) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/ application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions.

The description may refer only to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components (e.g., the processor 310 and the memory 311) of the TRP 300 (and thus of one of the BSs 110a, 110b, 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a wired transmitter 352 and a wired receiver 354 configured for wired communication, e.g., a network interface that may be utilized to communicate with the network 135 to send communications to, and receive communications from, the LMF 120, for example, and/or one or more other network entities. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
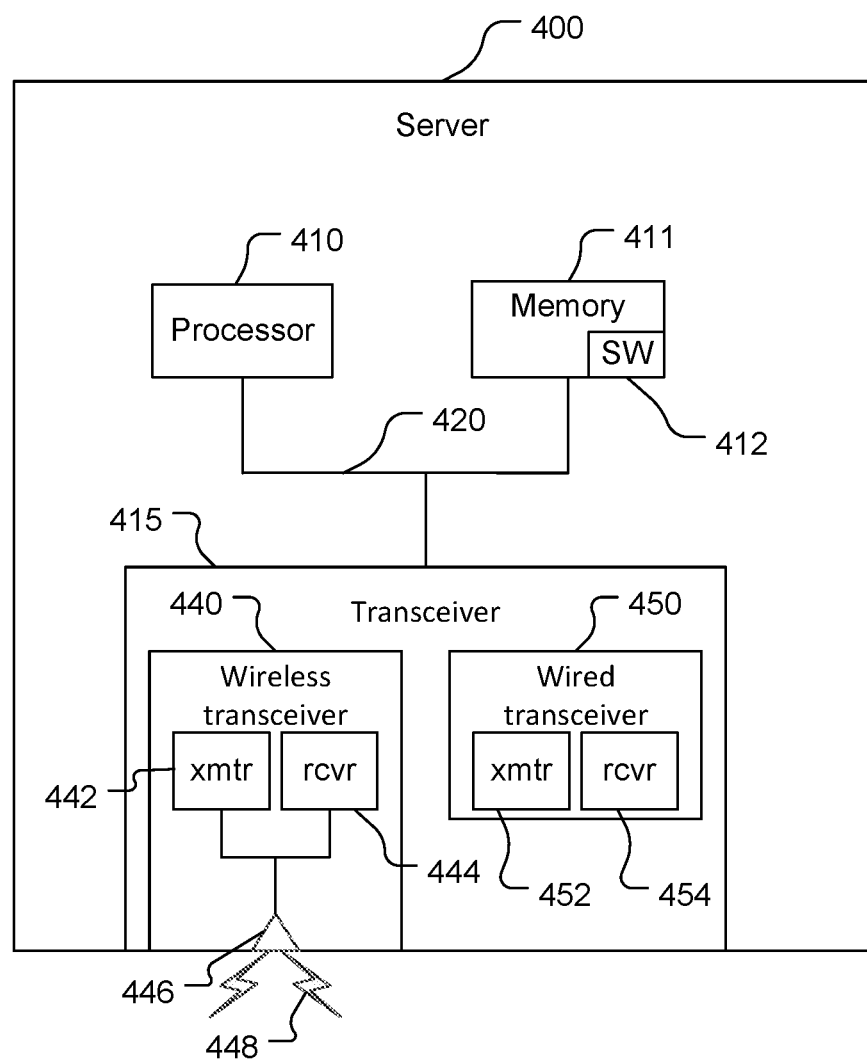
FIG. 4 is a block diagram of components of an example server, various embodiments of which are shown in FIG. 1.

Referring also to FIG. 4, a server 400, of which the LMF 120 is an example, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer only to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a wired transmitter 452 and a wired receiver 454 configured for wired communication, e.g., a network interface that may be utilized to communicate with the network 135 to send communications to, and receive communications from, the TRP 300, for example, and/or one or more other entities. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The description herein may refer only to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function.

Positioning Techniques

For terrestrial positioning of a UE in cellular networks, techniques such as Advanced Forward Link Trilateration (AFLT) and Observed Time Difference Of Arrival (OT-DOA) often operate in "UE-assisted" mode in which measurements of reference signals (e.g., PRS, CRS, etc.) transmitted by base stations are taken by the UE and then provided to a location server. The location server then calculates the position of the UE based on the measurements and known locations of the base stations. Because these techniques use the location server to calculate the position of the UE, rather than the UE itself, these positioning techniques are not frequently used in applications such as car or cell-phone navigation, which instead typically rely on satellite-based positioning.

A UE may use a Satellite Positioning System (SPS) (a Global Navigation Satellite System (GNSS)) for high-accuracy positioning using precise point positioning (PPP) or real time kinematic (RTK) technology. These technologies use assistance data such as measurements from ground-based stations. LTE Release 15 allows the data to be encrypted so that only the UEs subscribed to the service can read the information. Such assistance data varies with time. Thus, a UE subscribed to the service may not easily "break encryption" for other UEs by passing on the data to other UEs that have not paid for the subscription. The passing on would need to be repeated every time the assistance data changes.

In UE-assisted positioning, the UE sends measurements (e.g., TDOA, Angle of Arrival (AoA), etc.) to the positioning server (e.g., LMF/eSMLC). The positioning server has the base station almanac (BSA) that contains multiple 'entries' or 'records', one record per cell, where each record contains geographical cell location but also may include other data. An identifier of the 'record' among the multiple 'records' in the BSA may be referenced. The BSA and the measurements from the UE may be used to compute the position of the UE.

In conventional UE-based positioning, a UE computes its own position, thus avoiding sending measurements to the network (e.g., location server), which in turn improves latency and scalability. The UE uses relevant BSA record information (e.g., locations of gNBs (more broadly base stations)) from the network. The BSA information may be encrypted. But since the BSA information varies much less often than, for example, the PPP or RTK assistance data described earlier, it may be easier to make the BSA information (compared to the PPP or RTK information) available to UEs that did not subscribe and pay for decryption keys. Transmissions of reference signals by the gNBs make BSA information potentially accessible to crowd-sourcing or war-driving, essentially enabling BSA information to be generated based on in-the-field and/or over-the-top observations.

Positioning techniques may be characterized and/or assessed based on one or more criteria such as position determination accuracy and/or latency. Latency is a time elapsed between an event that triggers determination of position-related data and the availability of that data at a positioning system interface, e.g., an interface of the LMF 120. At initialization of a positioning system, the latency for the availability of position-related data is called time to first fix (TTFF), and is larger than latencies after the TTFF. An inverse of a time elapsed between two consecutive position-related data availabilities is called an update rate, i.e., the rate at which position-related data are generated after the first fix. Latency may depend on processing capability, e.g., of the UE. For example, a UE may report a processing capability of the UE as a duration of DL PRS symbols in units of time (e.g., milliseconds) that the UE can process every T amount of time (e.g., T ms) assuming 272 PRB (Physical Resource Block) allocation. Other examples of capabilities that may affect latency are a number of TRPs from which the UE can process PRS, a number of PRS that the UE can process, and a bandwidth of the UE.

One or more of many different positioning techniques (also called positioning methods) may be used to determine position of an entity such as one of the UEs 105, 106. For example, known position-determination techniques include RTT, multi-RTT, OTDOA (also called TDOA and including UL-TDOA and DL-TDOA), Enhanced Cell Identification (E-CID), DL-AoD, UL-AoA, etc. RTT uses a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. In TDOA techniques, the difference in travel times between one entity and other entities may be used to determine relative ranges from the other entities and those, combined with known locations of the other entities may be used to determine the location of the one entity. Angles of arrival and/or departure may be used to help determine location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). E-CID uses the identity of a serving cell, the timing advance (i.e., the difference between receive and transmit times at the UE), estimated timing and power of detected neighbor cell signals, and possibly angle of arrival (e.g., of a signal at the UE from the base station or vice versa) to determine location of the UE. In TDOA, the difference in arrival times at a receiving device of signals from different sources along with known locations of the sources and known offset of transmission times from the sources are used to determine the location of the receiving device.

In a network-centric RTT estimation, the serving base station instructs the UE to scan for/receive RTT measurement signals (e.g., PRS) on serving cells of two or more neighboring base stations (and typically the serving base station, as at least three base stations are needed). The one of more base stations transmit RTT measurement signals on low reuse resources (e.g., resources used by the base station to transmit system information) allocated by the network (e.g., a location server such as the LMF 120). The UE records the arrival time (also referred to as a receive time, a reception time, a time of reception, or a time of arrival (ToA)) of each RTT measurement signal relative to the UE's current downlink timing (e.g., as derived by the UE from a DL signal received from its serving base station), and transmits a common or individual RTT response message (e.g., SRS (sounding reference signal) for positioning, i.e., UL-PRS) to the one or more base stations (e.g., when instructed by its serving base station) and may include the time difference $T_{Rx \to Tx}$ (i.e., UE $T_{RX\text{-}TX}$ or $UE_{RX\text{-}TX}$) between the ToA of the RTT measurement signal and the transmission time of the RTT response message in a payload of each RTT response message. The RTT response message would include a reference signal from which the base station can deduce the ToA of the RTT response. By comparing the difference $T_{Tx \to Rx}$ between the transmission time of the RTT measurement signal from the base station and the ToA of the RTT response at the base station to the UE-reported time difference $T_{Rx \to Tx}$, the base station can deduce the propagation time between the base station and the UE, from which the base station can determine the distance between the UE and the base station by assuming the speed of light during this propagation time.

A UE-centric RTT estimation is similar to the network-based method, except that the UE transmits uplink RTT measurement signal(s) (e.g., when instructed by a serving base station), which are received by multiple base stations in the neighborhood of the UE. Each involved base station responds with a downlink RTT response message, which may include the time difference between the ToA of the RTT measurement signal at the base station and the transmission time of the RTT response message from the base station in the RTT response message payload.

For both network-centric and UE-centric procedures, the side (network or UE) that performs the RTT calculation typically (though not always) transmits the first message(s) or signal(s) (e.g., RTT measurement signal(s)), while the other side responds with one or more RTT response message(s) or signal(s) that may include the difference between the ToA of the first message(s) or signal(s) and the transmission time of the RTT response message(s) or signal(s).

A multi-RTT technique may be used to determine position. For example, a first entity (e.g., a UE) may send out one or more signals (e.g., unicast, multicast, or broadcast from the base station) and multiple second entities (e.g., other TSPs such as base station(s) and/or UE(s)) may receive a signal from the first entity and respond to this received signal. The first entity receives the responses from the multiple second entities. The first entity (or another entity such as an LMF) may use the responses from the second entities to determine ranges to the second entities and may use the multiple ranges and known locations of the second entities to determine the location of the first entity by trilateration.

In some instances, additional information may be obtained in the form of an angle of arrival (AoA) or angle of departure (AoD) that defines a straight line direction (e.g., which may be in a horizontal plane or in three dimensions) or possibly a range of directions (e.g., for the UE from the locations of base stations). The intersection of two directions can provide another estimate of the location for the UE.

For positioning techniques using PRS (Positioning Reference Signal) signals (e.g., TDOA and RTT), PRS signals sent by multiple TRPs are measured and the arrival times of the signals, known transmission times, and known locations of the TRPs used to determine ranges from a UE to the TRPs. For example, an RSTD (Reference Signal Time Difference) may be determined for PRS signals received from multiple TRPs and used in a TDOA technique to determine position (location) of the UE. A positioning reference signal may be referred to as a PRS or a PRS signal. The PRS signals are typically sent using the same power and PRS signals with the same signal characteristics (e.g., same frequency shift) may interfere with each other such that a PRS signal from a more distant TRP may be overwhelmed by a PRS signal from a closer TRP such that the signal from the more distant TRP may not be detected. PRS muting may be used to help reduce interference by muting some PRS signals (reducing the power of the PRS signal, e.g., to zero and thus not transmitting the PRS signal). In this way, a weaker (at the UE) PRS signal may be more easily detected by the UE without a stronger PRS signal interfering with the weaker PRS signal. The term RS, and variations thereof (e.g., PRS, SRS), may refer to one reference signal or more than one reference signal.

Positioning reference signals (PRS) include downlink PRS (DL PRS) and uplink PRS (UL PRS) (which may be called SRS (Sounding Reference Signal) for positioning). PRS may comprise PRS resources or PRS resource sets of a frequency layer. A DL PRS positioning frequency layer (or simply a frequency layer) is a collection of DL PRS resource sets, from one or more TRPs, that have common parameters configured by higher-layer parameters DL-PRS-Positioning-FrequencyLayer, DL-PRS-ResourceSet, and DL-PRS-Resource. Each frequency layer has a DL PRS subcarrier spacing (SCS) for the DL PRS resource sets and the DL PRS resources in the frequency layer. Each frequency layer has a DL PRS cyclic prefix (CP) for the DL PRS resource sets and the DL PRS resources in the frequency layer. In 5G, a resource block occupies 12 consecutive subcarriers and a specified number of symbols. Also, a DL PRS Point A parameter defines a frequency of a reference resource block (and the lowest subcarrier of the resource block), with DL PRS resources belonging to the same DL PRS resource set having the same Point A and all DL PRS resource sets belonging to the same frequency layer having the same Point A. A frequency layer also has the same DL PRS bandwidth, the same start PRB (and center frequency), and the same value of comb size (i.e., a frequency of PRS resource elements per symbol such that for comb-N, every $N^{th}$ resource element is a PRS resource element). A PRS resource set is identified by a PRS resource set ID and may be associated with a particular TRP (identified by a cell ID) transmitted by an antenna panel of a base station. A PRS resource ID in a PRS resource set may be associated with an omnidirectional signal, and/or with a single beam (and/or beam ID) transmitted from a single base station (where a base station may transmit one or more beams). Each PRS resource of a PRS resource set may be transmitted on a different beam and as such, a PRS resource, or simply resource can also be referred to as a beam. This does not have any implications on whether the base stations and the beams on which PRS are transmitted are known to the UE.

A TRP may be configured, e.g., by instructions received from a server and/or by software in the TRP, to send DL PRS per a schedule. According to the schedule, the TRP may send the DL PRS intermittently, e.g., periodically at a consistent interval from an initial transmission. The TRP may be configured to send one or more PRS resource sets. A resource set is a collection of PRS resources across one TRP, with the resources having the same periodicity, a common muting pattern configuration (if any), and the same repetition factor across slots. Each of the PRS resource sets comprises multiple PRS resources, with each PRS resource comprising multiple Resource Elements (REs) that may be in multiple Resource Blocks (RBs) within N (one or more) consecutive symbol(s) within a slot. An RB is a collection of REs spanning a quantity of one or more consecutive symbols in the time domain and a quantity (12 for a 5G RB) of consecutive sub-carriers in the frequency domain. Each PRS resource is configured with an RE offset, slot offset, a symbol offset within a slot, and a number of consecutive symbols that the PRS resource may occupy within a slot. The RE offset defines the starting RE offset of the first symbol within a DL PRS resource in frequency. The relative RE offsets of the remaining symbols within a DL PRS resource are defined based on the initial offset. The slot offset is the starting slot of the DL PRS resource with respect to a corresponding resource set slot offset. The symbol offset determines the starting symbol of the DL PRS resource within the starting slot. Transmitted REs may repeat across slots, with each transmission being called a repetition such that there may be multiple repetitions in a PRS resource. The DL PRS resources in a DL PRS resource set are associated with the same TRP and each DL PRS resource has a DL PRS resource ID. A DL PRS resource ID in a DL PRS resource set is associated with a single beam transmitted from a single TRP (although a TRP may transmit one or more beams).

A PRS resource may also be defined by quasi-co-location and start PRB parameters. A quasi-co-location (QCL) parameter may define any quasi-co-location information of the DL PRS resource with other reference signals. The DL PRS may be configured to be QCL type D with a DL PRS or SS/PBCH (Synchronization Signal/Physical Broadcast Channel) Block from a serving cell or a non-serving cell. The DL PRS may be configured to be QCL type C with an SS/PBCH Block from a serving cell or a non-serving cell. The start PRB parameter defines the starting PRB index of the DL PRS resource with respect to reference Point A. The starting PRB index has a granularity of one PRB and may have a minimum value of 0 and a maximum value of 2176 PRBs.

A PRS resource set is a collection of PRS resources with the same periodicity, same muting pattern configuration (if any), and the same repetition factor across slots. Every time all repetitions of all PRS resources of the PRS resource set are configured to be transmitted is referred as an "instance". Therefore, an "instance" of a PRS resource set is a specified number of repetitions for each PRS resource and a specified number of PRS resources within the PRS resource set such that once the specified number of repetitions are transmitted for each of the specified number of PRS resources, the instance is complete. An instance may also be referred to as an "occasion." A DL PRS configuration including a DL PRS transmission schedule may be provided to a UE to facilitate (or even enable) the UE to measure the DL PRS.

Multiple frequency layers of PRS may be aggregated to provide an effective bandwidth that is larger than any of the bandwidths of the layers individually. Multiple frequency layers of component carriers (which may be consecutive and/or separate) and meeting criteria such as being quasi co-located (QCLed), and having the same antenna port, may be stitched to provide a larger effective PRS bandwidth (for DL PRS and UL PRS) resulting in increased time of arrival measurement accuracy. Being QCLed, the different frequency layers behave similarly, enabling stitching of the PRS to yield the larger effective bandwidth. The larger effective bandwidth, which may be referred to as the bandwidth of an aggregated PRS or the frequency bandwidth of an aggregated PRS, provides for better time-domain resolution (e.g., of TDOA). An aggregated PRS includes a collection of PRS resources and each PRS resource of an aggregated PRS may be called a PRS component, and each PRS component may be transmitted on different component carriers, bands, or frequency layers, or on different portions of the same band.

RTT positioning is an active positioning technique in that RTT uses positioning signals sent by TRPs to UEs and by UEs (that are participating in RTT positioning) to TRPs. The TRPs may send DL-PRS signals that are received by the UEs and the UEs may send SRS (Sounding Reference Signal) signals that are received by multiple TRPs. A sounding reference signal may be referred to as an SRS or an SRS signal. In 5G multi-RTT, coordinated positioning may be used with the UE sending a single UL-SRS for positioning that is received by multiple TRPs instead of sending a separate UL-SRS for positioning for each TRP. A TRP that participates in multi-RTT will typically search for UEs that are currently camped on that TRP (served UEs, with the TRP being a serving TRP) and also UEs that are camped on neighboring TRPs (neighbor UEs). Neighbor TRPs may be TRPs of a single BTS (e.g., gNB), or may be a TRP of one BTS and a TRP of a separate BTS. For RTT positioning, including multi-RTT positioning, the DL-PRS signal and the UL-SRS for positioning signal in a PRS/SRS for positioning signal pair used to determine RTT (and thus used to determine range between the UE and the TRP) may occur close in time to each other such that errors due to UE motion and/or UE clock drift and/or TRP clock drift are within acceptable limits. For example, signals in a PRS/SRS for positioning signal pair may be transmitted from the TRP and the UE, respectively, within about 10 ms of each other. With SRS for positioning signals being sent by UEs, and with PRS and SRS for positioning signals being conveyed close in time to each other, it has been found that radio-frequency (RF) signal congestion may result (which may cause excessive noise, etc.) especially if many UEs attempt positioning concurrently and/or that computational congestion may result at the TRPs that are trying to measure many UEs concurrently.

RTT positioning may be UE-based or UE-assisted. In UE-based RTT, the UE 200 determines the RTT and corresponding range to each of the TRPs 300 and the position of the UE 200 based on the ranges to the TRPs 300 and known locations of the TRPs 300. In UE-assisted RTT, the UE 200 measures positioning signals and provides measurement information to the TRP 300, and the TRP 300 determines the RTT and range. The TRP 300 provides ranges to a location server, e.g., the server 400, and the server determines the location of the UE 200, e.g., based on ranges to different TRPs 300. The RTT and/or range may be determined by the TRP 300 that received the signal(s) from the UE 200, by this TRP 300 in combination with one or more other devices, e.g., one or more other TRPs 300 and/or the server 400, or by one or more devices other than the TRP 300 that received the signal(s) from the UE 200.

Various positioning techniques are supported in 5G NR. The NR native positioning methods supported in 5G NR include DL-only positioning methods, UL-only positioning methods, and DL+UL positioning methods. Downlink-based positioning methods include DL-TDOA and DL-AoD. Uplink-based positioning methods include UL-TDOA and UL-AoA. Combined DL+UL-based positioning methods include RTT with one base station and RTT with multiple base stations (multi-RTT).

A position estimate (e.g., for a UE) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

Figure 5:
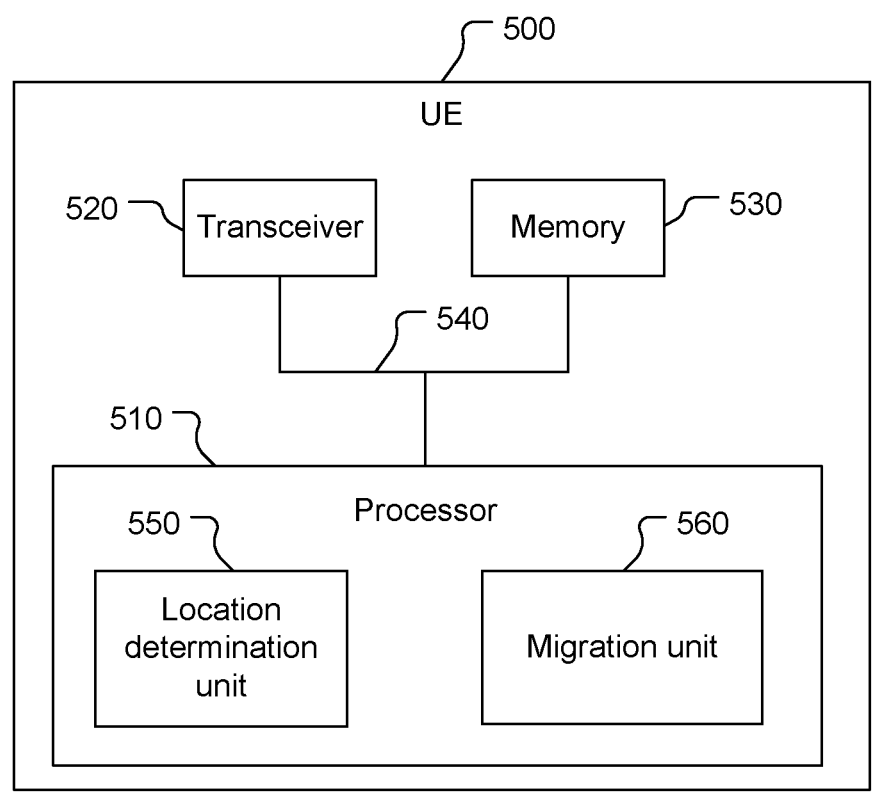
FIG. 5 is a block diagram of an example user equipment.

Referring to FIG. 5, with further reference to FIGS. 1-4, a UE 500 includes a processor 510, a transceiver 520, and a memory 530 communicatively coupled to each other by a bus 540. The UE 500 may be a VUE (Vehicle User Equipment), a VRU (Vulnerable Road User) UE, or another type of UE. The UE 500 may include the components shown in FIG. 5, and may include one or more other components such as any of those shown in FIG. 2 such that the UE 200 may be an example of the UE 500. For example, the processor 510 may include one or more of the components of the processor 210. The transceiver 520 may include one or more of the components of the transceiver 215, e.g., the wireless transmitter 242 and the antenna 246, or the wireless receiver 244 and the antenna 246, or the wireless transmitter 242, the wireless receiver 244, and the antenna 246. Also or alternatively, the transceiver 520 may include the wired transmitter 252 and/or the wired receiver 254. The memory 530 may be configured similarly to the memory 211, e.g., including software with processor-readable instructions configured to cause the processor 510 to perform functions.

The description herein may refer only to the processor 510 performing a function, but this includes other implementations such as where the processor 510 executes software (stored in the memory 530) and/or firmware. The description herein may refer to the UE 500 performing a function as shorthand for one or more appropriate components (e.g., the processor 510 and the memory 530) of the UE 500 performing the function. The processor 510 (possibly in conjunction with the memory 530 and, as appropriate, the transceiver 520) may include a location determination unit 550 and a migration unit 560. For example, either a VUE or a VRU UE may or may not include the units 550, 560, with a VUE typically including the units 550, 560 and a VRU UE typically not including the units 550, 560. The location determination unit 550 and the migration unit 560 are discussed further below, and the description may refer to the processor 510 generally, or the UE 500 generally, as performing any of the functions of the location determination unit 550 and/or the migration unit 560.

Figure 6:
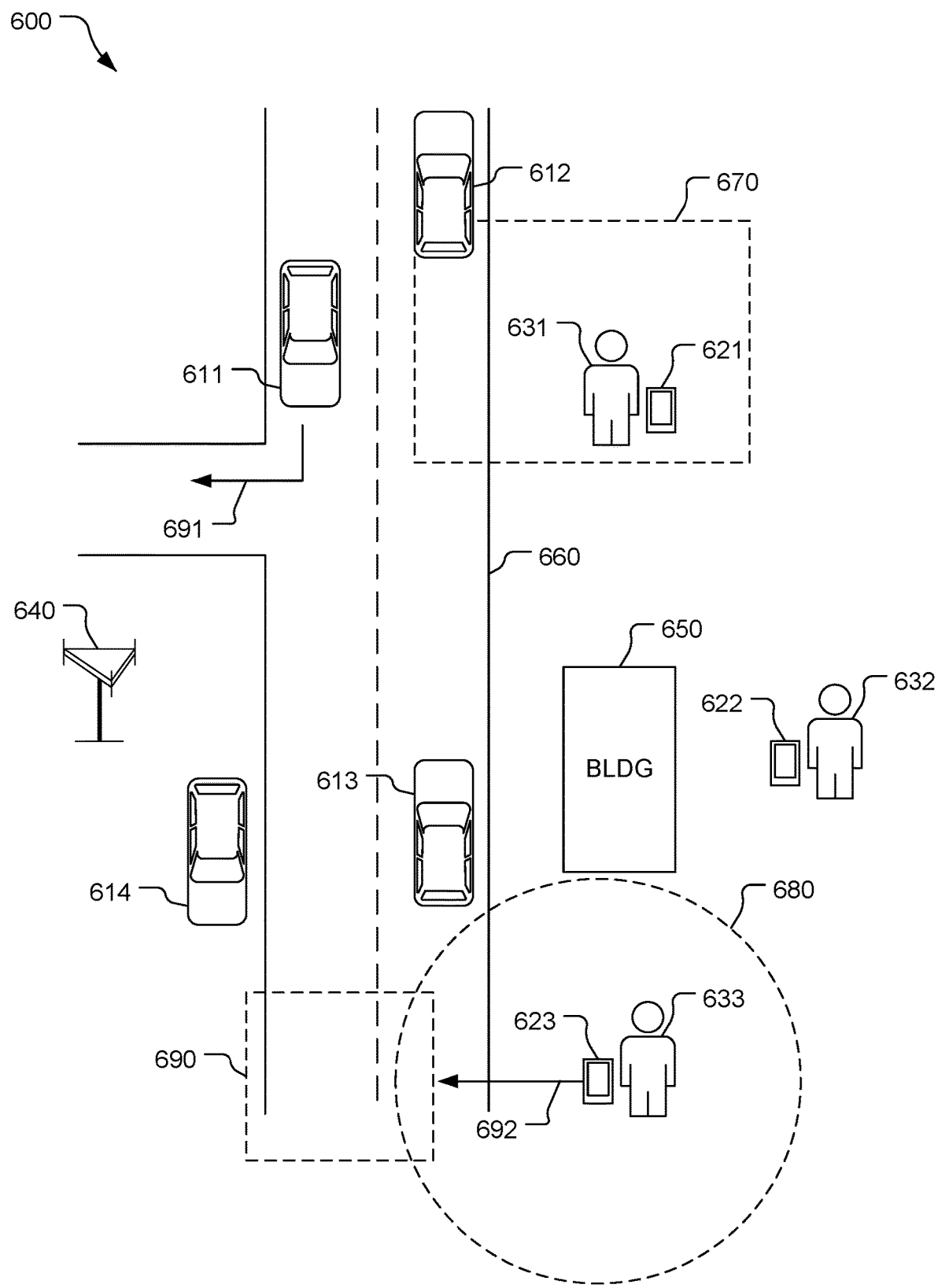
FIG. 6 is a simplified top view of an environment with user equipments (UEs) including vehicle UEs and vulnerable road user UEs.

Referring also to FIG. 6, an environment 600 includes multiple VUEs 611, 612, 613, 614, multiple VRU UEs 621, 622, 623 associated with respective VRUs 631, 632, 633, a roadside unit (RSU) 640, a building 650, and a road 660. The VRUs 631-633 in this example are all pedestrians, but this is an example only, and VRU UEs may be associated with other types of VRUs such as bicyclists, skateboarders, joggers, etc. The RSU 640 may exchange signals (e.g., PRS) with one or more of the VUEs 611-614 and/or one or more of the VRU UEs 621-623 to determine locations and/or velocities of one or more of the UEs 611-614, 621-623. In environments such as the environment 600, vehicle-to-pedestrian (V2P) communication may be used to improve pedestrian safety. For example, the VUEs 611-614 may each determine the location of one or more of the VRU UEs 621-623 may do so over time (i.e., tracking the VRU UE(s) 621-623). Each of the VUEs 611-614 may be able to predict a collision between the respective VUE 611-614 and one or more of the VRU UEs 621-623 (and thus presumably with the associated VRU(s) 631-633). The VUE(s) 611-614 may respond to predicting a collision by sending a warning to the appropriate VRU UE(s) 621-623 which may then alert the associated VRU(s) 631-633 so that the VRU(s) 631-633 may take appropriate action to avoid the collision. The VUEs 611-614 may obtain the locations of the VRU UEs 621-623 in one or more ways by making one or more measurements, exchanging one or more signals with one or more other VUEs 611-614 through V2V messages, and/or communicating with one or more of the VRU UEs 621-623 through P2V (Pedestrian-to-Vehicle) messages. For example, the VUEs 611-614 may exchange PRS with the VRU UEs 621-623, may use radar or other ranging technology, may analyze computer vision information (e.g., captured images), may receive indications of the locations from the VRU UEs 621-623, e.g., as determined by the VRU UEs 621-623 from GNSS signal measurement, etc. Each of the VRU UEs 621-623 may, for example, report the location of the respective VRU UE 621-623 periodically to one or more of the VUEs 611-614 through a public safety message (PSM) or basic safety message (BSM) either of which may be a unicast, multicast, or broadcast message. The VUEs 611-614 may leverage information from one or more other entities, e.g., one or more other VUEs 611-614, to improve the state estimate (location and velocity (direction and speed of movement)) of each of the VRU UEs 621-623 in order to improve accuracy of collision prediction, and thus to improve collision avoidance.

Position information (e.g., measurements, ranges, position estimates) obtained (collected, calculated, etc.) at the network edge in the environment 600 may be relevant for a limited amount of time due to one or more of a variety of factors. For example, due to the mobile nature of objects in the environment 600, movement of the VRUs 631-633 and thus the VRU UEs 621-623, and/or movement of the VUEs 611-614, position information may change rapidly. Movement, e.g., onto or off of the road 660, behind or away from the building 650, etc., may change ranges, proximity of UEs, and/or geometry between UEs, and/or produce transient conditions such as blockage and/or interference. As another example, assumptions may be time limited, e.g., for threshold times and/or areas expected to be occupied by a VRU UE and/or a VUE. Movement and/or assumptions may affect confidence and/or accuracy of determined position information. While a static infrastructure for obtaining position information may help reduce variance and improve accuracy, a static infrastructure is not required, and benefits of a mobile infrastructure that is proximate to a UE whose location and/or velocity is(are) to be determined may outweigh benefits of a stationary infrastructure. For example, a mobile VUE determining location of a mobile VRU UE may reduce time that the VRU UE is obstructed.

One or more of the VUEs 611-614 may provide centralized UE (VRU UE and/or VUE) location determination (including tracking). A centralized UE is an aggregator of information from multiple sources and may or may not be centrally located relative to the sources from which the centralized UE aggregates information and/or relative to one or more UEs (e.g., VRU UEs) to which the aggregated information pertains. Centralized location determination may help provide more accurate location estimates for the VRU UEs 621-623, e.g., compared to individual VUEs 611-614 having different location and/or velocity determinations for the same VRU UE (e.g., due to different location determination processes used), may help improve location determination of VRU UEs, and/or may help save power (e.g., by having VRU UEs send information to less than all the VUEs 611-614). Location determination of VRU UEs that are obstructed from one or more VUEs 611-614 may be improved due to multiple points of view to the VRU UEs such that when a VRU UE is obstructed from one VUE, the VRU UE may not be obstructed from one or more other VUEs. The central UE may be static (stationary) such as the VUE 614 or mobile. A VUE may implement a single location determination process to aggregate information from one or more VRU UEs 621-623 and one or more VUEs 611-614 and send state estimates to relevant devices, e.g., one or more VRU UE state estimates to one or more VUEs and/or one or more VUE state estimates to one or more VRU UEs. The centralized location determination may be more accurate by considering more information than distributed location determination and/or by applying more accurate processing than in distributed location determination processing.

The location determination unit 550 is configured to determine position information (e.g., range(s), position estimate(s)) based on position information (e.g., measurement(s), range(s), position estimate(s)) from multiple sources of position information, each source providing some position information, e.g., a measurement. The multiple sources of position information may include the UE 500 itself in addition to one or more other sources, or may include only sources external to the UE 500. The UE 500 may be configured to implement a tracking process (e.g., a Kalman filter) in a virtual machine, i.e., an entity including data (e.g., a database) and an algorithm to track state information (e.g., speed, heading, and/or location) for one or more other entities such as one or more other UEs (with, possibly, different state information tracked for different entities). The unit 550 may collect information from one or more of the VUEs 611-614 and/or one or more of the VRU UEs 621-623 (e.g., GNSS data, computer vision data, ranging data (e.g., PRS data), radar data, position estimate(s), etc.) The unit 550 may aggregate the collected information to determine the location and/or velocity of one or more of the VUEs 611-614 and/or one or more of the VRU UEs 621-623. The unit 550 may also send the location(s) and/or velocity(ies) of one or more indicated entities (e.g., one or more of the VUEs 611-614 and/or one or more of the VRU UEs 621-623) to one or more appropriate recipient entities, e.g., the VUE(s) 611-614 and/or the VRU UE(s) 621-623 to which the information may be relevant, e.g., that is(are) in a similar area and/or that is(are) heading to a common location as (and thus may collide with) the indicated entity(ies). By aggregating information from multiple entities at different locations, multiple perspectives of a single entity (VUE or VRU UE) may be obtained. This may help obtain information for entities, may help distinguish different types of VRUs (e.g., pedestrians versus cyclists), may help detect obstructed objects (e.g., a VRU obstructed from one VUE but not obstructed from another VUE), and/or may help improve robustness in view of false alarms. For example, false alarms may be reduced by using information from multiple VUEs to confirm or deny the presence of a VRU UE (or other object) at a given location.

The migration unit 560 is configured to migrate information from the UE 500 to another UE for use in determining the location and/or velocity of one or more entities. The migration unit 560 may be configured to identify another UE to which to send migration information, with the migration information including position information received from one or more other entities by the UE 500 and/or position information obtained (e.g., measured and/or determined) by the UE 500, e.g., the location determination unit 550. The migration information may include any appropriate information, e.g., such that the migration unit 560 may migrate a virtual machine, to facilitate the recipient UE to assume responsibility for (centralized) position determination. The UE 500 may determine position information and/or collect position information from other UEs and provide this information to other UEs (whether the UE provided information to the UE 500 or not). The other UEs (e.g., VUEs) may have determined position information differently than the UE 500 (e.g., due to different input information and/or a different calculation algorithm) or may not have determined position information. The migration information may include IDs and locations of tracked UEs, e.g., of VRU UEs and/or VUEs tracked by the UE 500. The migration information may include, for each of one or more of the tracked UEs, velocity of a tracked UE, confidence of location of the tracked UE, signal history of the tracked UE (e.g., frequency of signal receipt, percent of expected signals received from the tracked UE, etc.), and/or location history of the tracked UE (e.g., a path taken by the tracked UE).

The migration unit 560 may be configured to identify another entity to which to send the migration information in one or more of a variety of ways. For example, the migration unit 560 may be configured to determine whether the entity(ies) meet one or more migration criteria in order to determine whether to send the migration information and if so, to which entity(ies). The entity(ies) may be one or more other UEs. The one or more migration criteria may include, for example, whether an entity is static (stationary), present or future presence of the candidate entity for receiving the migration information in a specified region, a proximity of the entity to which the migration information pertains and the candidate entity for receiving the migration information, a proximity between the UE 500 and the candidate entity for receiving the migration information, etc. The migration unit 560 may be configured to send a message inquiring whether any other entities are interested in position information associated with a particular UE, or a particular geographic region, or both. The one or more migration criteria may include whether a response to the message was received indicating interest in the position information by an entity (e.g., requesting the migration information). An entity may express interest in (e.g., request) the migration information, for example, if the entity is presently proximate to (e.g., in a region containing, and/or within a threshold distance of, and/or in communication range of) a region and/or UE(s) corresponding to the migration information. The migration unit 560 may be configured to identify one or more other entities based on the one or more criteria. For example, the migration unit 560 may be configured to identify the UE(s) that are relevant (or most relevant) to the migration information, e.g., the VUE(s) that are or will be close to the UEs for which position information is contained in the migration information (e.g., that may collide with one or more of the UEs of the migration information). As another example, the migration unit 560 may be configured to migrate position information to a network entity such as a roadside unit, a server, etc., in response to failing to identify a stationary UE to which to migrate the position information (i.e., send the migration information). The migration unit 560 may be configured to identify a single entity to receive the migration information or to identify multiple entities (if available and meet the one or more migration criteria) to receive the migration information.

The migration unit 560 may be configured to identify the entity to which to send the migration information and/or to send the migration information to an identified recipient in response to one or more trigger criteria. The one or more trigger criteria may include, for example, receipt of a request for the migration information, passage of a time (e.g., such that the migration information is sent periodically), and/or a relevance cessation determination that the UE 500 has become, is becoming, and/or is expected to become irrelevant with respect to an entity to which the migration information pertains. The UE 500 may become irrelevant due to, for example, movement of the UE 500 and/or the entity to which the migration information pertains). For example, the migration unit 560 of the VUE 612 may send migration information in response to determining that the VUE 612 is leaving a region 670 that includes the VRU UE 621. As another example, the migration unit 560 of the VUE 613 may send migration information in response to determining that the VUE 613 has left a region 680 that includes the VRU UE 623. Here, the region 680 is a circular region centered at the VRU UE 623 such that the migration unit 560 of the VUE 613 may determine that the VUE 613 is no longer within a threshold range (i.e., the radius of the region 680) of the VRU UE 623. As another example, the migration unit 560 of the VUE 611 may send migration information in response to determining that the VUE 611 will not intersect with the VRU UE 623, e.g., because an expected path 691 of the VUE 611 will not intersect with a region 690 corresponding to a path 692 of the VRU UE 623. As another example, a migration trigger may be expiration of a timer for the migration unit 560 to migrate position information to serve as a backup, e.g., sending the migration information intermittently (e.g., periodically). As another example, a migration trigger may be a response to a request for migration. Another example migration trigger is that the recipient of the migration information is proximate to (e.g., within a threshold range of) the migrating UE and/or is expected to be proximate to the migrating UE for at least a threshold amount of time. Another migration trigger may be a drop of more than a threshold amount of confidence in position information, or a drop below a threshold confidence for position information. The migration unit 560 may seek to migrate the position information to another UE that has higher confidence, e.g., regarding a position of a particular VRU UE. Still other migration triggers may be used.

A migration trigger may be an indication that one or more positioning signals may be spoofed. For example, a threshold change in a determined range to a VRU UE and/or a threshold change in position of the VRU UE that is inconsistent with historical (e.g., present) motion of the VRU UE may be an indication of spoofing. If, for example, if a VRU UE associated with a pedestrian changes position at a rate inconsistent with pedestrian travel, then potential spoofing may be indicated. Another spoofing indication may be receipt of a positioning signal of much higher power level than expected, e.g., significantly higher than most recently received from the same alleged source. Another spoofing indication may be one or more outlier conditions, such as where data points from multiple VRU UEs are the same or close, and a data point from another VRU UE differs significantly from the data points from the other VRU UEs. Data points may be considered similar if they are within a threshold similarity, e.g., within a threshold percentage, of each other. A data point may be considered to be significantly different from the other data points, and thus an outlier data point, if the outlier data point differs by more than a threshold difference (which may be the same as or different from (e.g., greater than) the threshold similarity) from the other data points. In response to a spoofing indication, position information from a VRU UE may be discounted or discarded, and/or migration triggered so that centralized location determination may be performed by an entity not receiving the inconsistent (and thus suspect) position information. Also or alternatively, one or more other precautions may be taken in response to detection of possible spoofing. For example, encryption (using a predetermined, trusted encryption key) may be required of position information provided by an alleged source of suspect position information. As another example, in response to possible spoofing regarding position of a particular VRU UE being determined by the VUE 614, the VUE 614 may obtain and analyze multiple positions determined for the particular VRU UE by multiple UEs other than the VUE 614 for consistency. If the other positions agree with the suspect position, then the suspect position may be used and otherwise the suspect position may be ignored.

Figure 7:
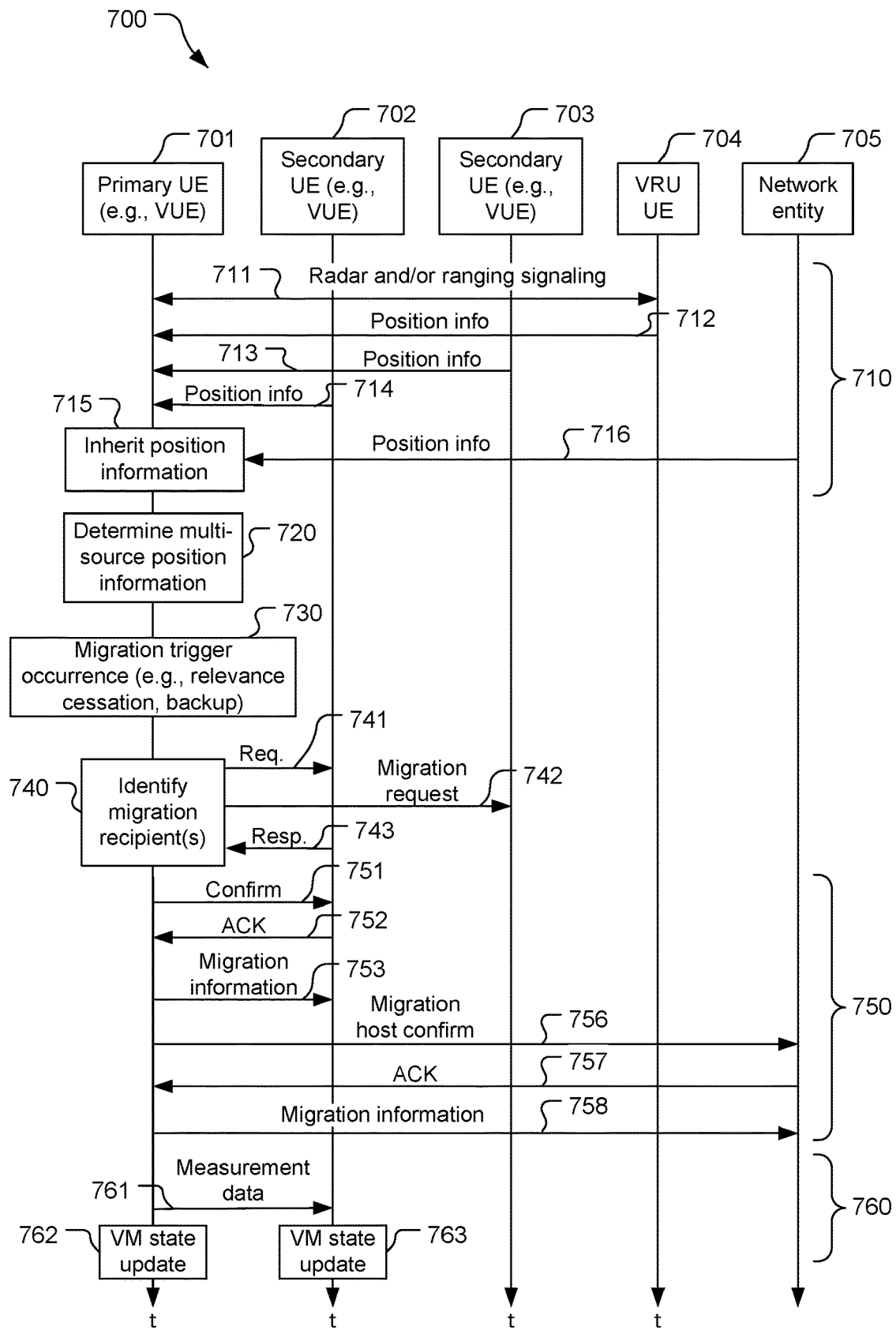
FIG. 7 is a signaling and process flow of for determining positioning information and migrating position information.

Referring to FIG. 7, with further reference to FIGS. 1-6, a signaling and process flow 700 for determining positioning information and migrating position information from a UE includes the stages shown. The flow 700 is an example only, as stages may be added, rearranged, and/or removed. For example, as discussed further below, position information may not be received by a central UE from secondary UEs and/or one or more migration recipients may be identified before migration is triggered. Still other modifications of the flow 700 are possible. In the flow 700, a primary UE 701 may interact with secondary UEs 702, 703, a VRU UE 704, and a network entity 705. Each of the UEs 701-703 may be an example of the UE 500, and may be a vehicle UE. The network entity 705 may be, e.g., a roadside unit, a server, a TRP, etc. The primary UE 701 in this example aggregates position information from multiple sources and provides centralized position information determination, and migration of position information (e.g., migration of a VM) by sending migration information as discussed below. This discussion below focuses on obtaining and determining positioning information (e.g., location of and possibly motion of, e.g., velocity) for the VRU UE 704, but the discussion is applicable to more VRU UEs and/or to other entities, e.g., to obtaining and/or determining positioning information for one or more of the UEs 702, 703.

At stage 710, the primary UE 701 obtains position information from multiple sources. The multiple sources may include two or more of the UEs 701-704. For example, the primary UE 701 may obtain position information (e.g., one or more measurements, ranges, and/or position estimates) through radar and/or ranging signaling 711. The primary UE 701 may send radar signals that are reflected by the VRU UE 704 and/or a VRU associated with the VRU UE 704, and the primary UE 701 may receive and measure the reflections. The primary UE 701 may also or alternatively exchange (send and/or receive) ranging signals (e.g., positioning signals such as SL-PRS (Sidelink PRS)) with the VRU UE 704. The primary UE 701 may measure the PRS to obtain the position information. Also or alternatively, the primary UE 701 may obtain position information by receiving a position information message 712 from the VRU UE 704. The message 712 may include one or more measurements made by the VRU UE 704 (e.g., of PRS from the primary UE 701 and/or from one or more other entities) and/or calculated position information (e.g., one or more ranges between the VRU UE 704 and one or more other entities, and/or one or more position estimates for the VRU UE 704 (e.g., based on SPS signals)). Also or alternatively, the primary UE 701 may obtain position information by receiving a position information message 713 from the secondary UE 703 and/or a position information message 714 from the secondary UE 702. The messages 713, 714 may include one or more measurements made by the secondary UEs 702, 703, respectively (e.g., of PRS from the VRU UE 704) and/or calculated position information (e.g., one or more ranges between the VRU UE 704 and the secondary UEs 702, 703, and/or one or more position estimates for the VRU UE 704).

At sub-stage 715, the primary UE 701 may inherit position information (e.g., for a VM). For example, the primary UE 701 may receive position information 716 from the network entity 705 (e.g., a cloud server, or an RSU or other network edge node). As another example, position information may be migrated from another UE (e.g., a VUE within sidelink range of the primary UE 701). The primary UE 701 may be new to an area of (or otherwise relevant to) the VRU UE 704, or may have been in the region of (or otherwise relevant to) the VRU UE 704 for some time.

At stage 720, the primary UE 701 determines multi-source position information. For example, the location determination unit 550 processes information from multiple sources, e.g., one or more measurements made by the processor 510 (e.g., of radar signals, PRS, etc.) of the primary UE 701, one or more measurements from one or more of the UEs 702-703, and/or one or more pieces of calculated position information from one or more of the UEs 702-704 to determine position information regarding the VRU UE 704. The location determination unit 550 may determine the position information by implementing a virtual machine. The determined position information may include, for example, a present location of the VRU UE 704, a future (predicted) location of the VRU UE 704, and/or a velocity of the VRU UE 704, etc.

At stage 730, a migration trigger occurs to trigger migration of position information (and possibly other information) from the primary UE 701. The information migrated by the primary UE 701 may be referred to as migration information. The migration information may include a virtual machine (VM) such that the VM is migrated from the primary UE 701. The migration information may be both sent by the primary UE 701 to one or more entities and retained (at least temporarily) by the primary UE 701. The migration trigger may initiate transfer of responsibility of the primary UE 701 for tracking one or more UEs (e.g., the VRU UEs 621-623) to another device to have responsibility for tracking one or more of the one or more UEs tracked by the primary UE 701. It may be desirable to transfer responsibility to another device for which the location(s) of the VRU UE(s) 621-623 is important, e.g., useful in helping to avoid one or more collisions. It may be desirable to transfer tracking responsibility to another UE and in particular another UE that is presently stationary as a stationary UE may be able to determine UE location more accurately and/or faster than a UE that is in motion. The trigger at stage 730 may be to transition away from the primary UE 701 having primary or any responsibility for tracking one or more UEs, or may be a backup mechanism. Migrating information to another entity even though the primary UE 701 continues to maintain the information may guard against the primary UE 701 unexpectedly ceasing to track UE location or otherwise ceasing to have primary responsibility for doing so. For example, the primary UE 701 may leave a relevant geographic area unexpectedly, and thus if another entity has the position information as a backup, then the other entity may take over tracking responsibility quickly. Providing data between the UEs provides a commonness between the UEs which may help prevent spoofing by being able to identify (and ignore) outlier information. While slight variation in position information due to local calculation differences (e.g., due to different measurements) may exist, large differences may indicate that input data have been spoofed, and thus the input data may be identified as anomalous. If a backup has been established, then the primary UE 701 may provide position information on an ongoing basis to the backup, e.g., as the position information is obtained (e.g., received, measured, calculated, etc.). The backup entity may thus have a duplicate of the position information stored by the primary UE 701.

Various types of migration triggers may be used, such as any of the trigger criteria discussed above. For example, a migration trigger may be a determination by the primary UE 701 of relevance cessation. The relevance cessation determination may comprise a determination that the primary UE 701 is ceasing, has ceased, or is expected to cease meeting one or more relevance criteria associated with the VRU UE 704 (or other UE of interest). The relevance criteria may include, for example, the primary UE 701 being within a geographic region presently containing the VRU UE 704 and/or expected to contain the VRU UE 704 in the future at the same time as the primary UE 701. The geographic region may be regularly-shaped (e.g., a rectangle, a circle centered at a VRU UE or other location, etc.). Still other trigger criteria may be used including, but not limited to, example trigger criteria discussed above.

At stage 740, the primary UE 701 identifies one or more UEs to receive the migration information. Stage 740 may be performed before or after stage 730 such that a migration trigger may trigger determination of one or more recipients of the migration information, or the recipient(s) may be predetermined and the migration information sent to the predetermined recipient(s) in response to a migration trigger. At stage 740, the primary UE 701 may send one or more migration requests to one or more UEs (that may be static or mobile) that are potential migration information recipients. Here, the primary UE 701 sends the migration recipient request 741 to the secondary UE 702 and the migration recipient request 742 to the secondary UE 703. The migration requests 741, 742 inquire as to whether the respective recipient (here the secondary UEs 702, 703) are interested in receiving migration information regarding locations of UEs. The migration requests 741, 742 may, for example, request a response from any UE meeting one or more relevance criteria such as any UE within a threshold distance of the primary UE 701, or within a specified region, or any entity interested in a specified region, or any entity interested in one or more specified VRU UEs, etc. The migration information may facilitate the recipient UE (i.e., the UE receiving the migration information) tracking UEs identified in the migration information, e.g., to shorten or even eliminate a time for the recipient UE to obtain measurements or other information to determine the locations of tracked UEs, e.g., at all or with desired accuracy. The recipient(s) of the migration request(s) 741, 742 may send a response indicating whether the recipient is interested in receiving the migration information. In the example of the flow 700, the secondary UE 702 sends a response 743 indicating that the secondary UE 702 would like to receive the migration information. In this example, the secondary UE 703 does not send a response to the migration request 742 (or sends a response that is not received by the primary UE 701). If no migration destination is identified at stage 740, e.g., no VUE is proximate to the primary UE 701 or the migration information is not relevant to another entity, then the migration information may be dropped by the primary UE 701, e.g., not provided to another entity (e.g., another VUE or a network entity) and possibly discarded. For example, if the migration information is not or will not be relevant to another entity such as a VUE (e.g., such that no danger of collisions is identified), then the primary UE 701 may not send the migration information anywhere.

At stage 750, the migration information is provided by the primary UE 701 to the appropriate other UE(s), the secondary UE 702 in this example, and to the network entity 705. The primary UE 701 sends a confirmation message 751 to the secondary URE 702 confirming that the secondary UE 702 has been selected as a recipient of the migration information. The secondary UE 702 sends an acknowledgement (ACK) message 752 confirming receipt of the confirmation message 751. The primary UE 701, e.g., the migration unit 560, responds to the ACK message 752 by sending migration information 753 to the secondary UE 702. The migration information includes the ID and location of each UE for which the primary UE 701 has such information, e.g., each UE tracked by the primary UE 701. The migration information 753 may include velocity, direction of travel, location confidence, location history, signal history, etc. The signal history may be an indication of signals received over time from a tracked UE, e.g., that a specified percentage of expected signals were received by the primary UE 701 (and/or another UE) over a specified time. For example, a tracked UE may send signals at a known rate and the amount of actually-received signals may be compared to the amount of signals sent (and thus expected to be received), e.g., to determine a ratio, a percentage, etc. The primary UE 701 sends a migration host confirmation message 756 to the network entity 705 indicating that migration information has been, is being, or will be sent to the secondary UE 702 such that the secondary UE 702 will host the migration information. The migration host confirmation message 756 may indicate that the secondary UE 702 is or will be a primary UE, having primary responsibility for tracking UEs, or may indicate that the secondary UE 702 will be a backup (e.g., with a duplicate virtual machine). The network entity 705 responds to the message 756 with an ACK message 757 and the primary UE 701 responds to the ACK message 757 by sending migration information 758 to the network entity 705. For example, the migration information may be sent to a cloud server, or a closest RSU/edge server, for storage (e.g., temporary storage) until the migration information becomes relevant to another entity, e.g., another UE. The migration information may be provided by the network entity to a new primary UE that is identified as wanting the migration information and/or to which the migration information is or is expected to be relevant (e.g., that is expected to approach within a threshold distance of at least one VRU UE for which the migration information includes location information). The migration information 758 may include all of the migration information 753 or subset thereof, e.g., the IDs and locations of tracked UEs. The migration information may be used by the secondary UE 702, which may now be the new primary UE, to determine and further track UEs (e.g., locations, velocities, paths, etc.).

At stage 760, virtual machine states may be updated. The primary UE 701 transmits measurement data 761 to the secondary UE 702 (i.e., the UE to which a virtual machine is migrated, e.g., to take over for the primary UE 701 or to serve as a backup to the primary UE 701). The measurement data 761 includes one or more measurements of one or more positioning signals. At sub-stages 762, 763, the UEs 701, 702 update, based on the measurement data 761, the state of the respective virtual machine stored by each the UEs 701, 702.

The flow 700 may be used for numerous situations, including where a UE enters a region with little or no information regarding VRU UEs in the region. For example, if the primary UE 701 is new to a region of the VRU UE 704, the primary UE 701 may attempt to obtain the position information 716 from the network entity 705 (e.g., cloud storage) and/or from one or more other entities such as one or more other UEs in the region. The position information 716 may include IDs and locations of VRU UEs in the region (e.g., migration information as discussed herein), which may enable the primary UE 701 to determine UE locations and/or track UEs in the region quickly, e.g., quicker than by gathering position information from scratch (e.g., making measurements). The primary UE 701 may also or alternatively make measurements of positioning signals and/or obtain the position information messages 712, 713 from the secondary UEs 702, 703.

More than one UE at a time may determine and/or collect position information, e.g., in a centralized manner to provide a federated model that uses distributed processing aspects and centralized processing aspects. For example, all of the UEs 701-704 may act as centralized yet distributed agents for determining and/or collecting position information. The distributed agents may have local models/tracking processes for determining position information but also be able to collaborate with other entities on a centralized tracking process. Thus, if other entities are unavailable or unable to provide position information to a UE, then the UE may determine position information in isolation (e.g., by taking measurements and possibly processing the measurements). If one or more other entities are available and able to provide position information, then the UE may provide a centralized tracking process. The centralized process may propagate back the aggregated (federated) model to the other entities, e.g., other UEs. The distributes UEs may obtain shared information and make decisions based on that information (e.g., track a UE, avoid a UE, etc.). Distributed UEs may remain active and aware of the environment(s) around the UEs even in the absence of a centralized model, while benefitting from a centralized model if one is available. Advantages of centralization may be realized without using a centralized server (e.g., an RSU), for example, by having a VUE share information and performing combined processing more locally than a central server. The distributed agents may decide to give more or less importance to the model propagated back from the centralized tracking process. For example, in a densely populated area (with many UEs) such as a dense urban scenario, the centralized model may be relied on more than distributed determinations, but in a sparsely populated area (with few UEs from which to gather data) such as a rural area, the centralized model may be relied upon less (if at all), e.g., with each UE relying on data collected by that UE rather than data received from a centralized source.

The flow 700, e.g., for the environment 600, may provide one or more of various advantages. For example, flexibility in position information determination may be provided by providing centralized processing with or without fixed infrastructure, and/or by allowing a UE to elect to participate in centralized processing or not. Fixed infrastructure such as RSUs may be sparsely deployed to avoid high infrastructure costs (which may save capital expense and operating expense for network operators). Cost savings may be more pronounced in areas of highest need, e.g., high-density urban areas where large amounts of infrastructure may be avoided due to high-UE density. Various incentives may be provided to help ensure participation of sufficient quantities of UEs to realize the infrastructure reduction. For example, performance benefits (e.g., higher data rates, lower data costs, etc.) may be provided to users to incentivize the users to let the UEs of the users be used for centralized processing. The use of the UEs for centralized processing may in turn benefit network operators, e.g., by enabling the network operators to provide more and/or better services, e.g., higher positioning accuracy, collision avoidance services, etc.

Figure 8:
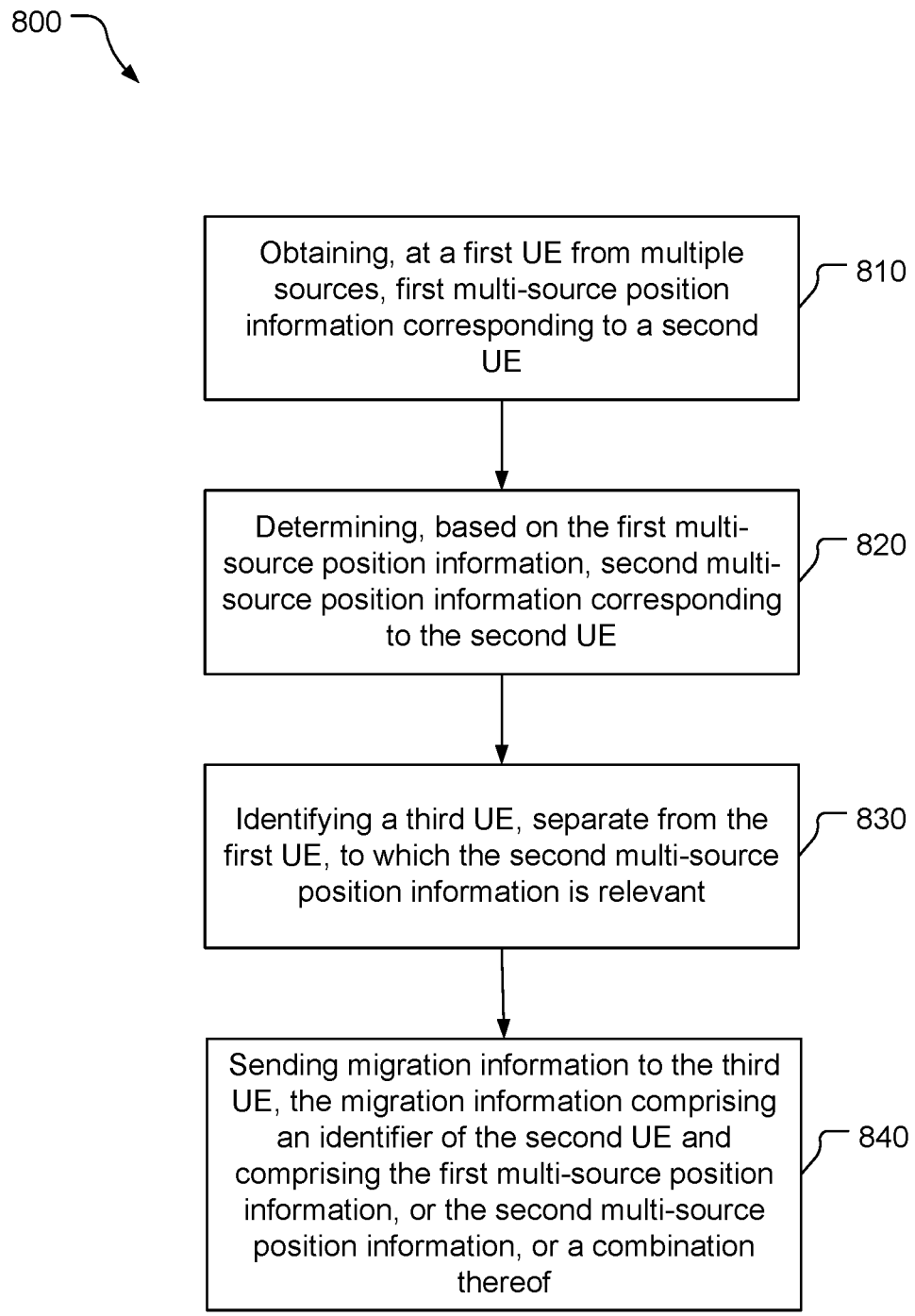
FIG. 8 is a block flow diagram of a method of centralized device tracking.

Referring to FIG. 8, with further reference to FIGS. 1-7, a method 800 of centralized device tracking includes the stages shown. The method 800 is, however, an example only and not limiting. The method 800 may be altered, e.g., by having stages added, removed, rearranged, combined, performed concurrently, and/or having single stages split into multiple stages.

At stage 810, the method 800 includes obtaining, at a first UE from multiple sources, first multi-source position information corresponding to a second UE. For example, the primary UE 701 may measure one or more positioning signals to determine position information and receive (via the transceiver 520) position information from one or more sources (e.g., at least one other UE), or the primary UE 701 may receive position information from multiple sources, e.g., multiple UEs. Thus, the primary UE 701 may receive position information from a combination of multiple sources and the multiple sources may or may not include the first UE. The processor 510, possibly in combination with the memory 530, in combination with the transceiver 520 (e.g., the wireless transmitter 242 and the antenna 246, or the wireless receiver 244 and the antenna 246, or the wireless transmitter 242, the wireless receiver 244, and the antenna 246) may comprise means for obtaining first multi-source position information corresponding to the second UE.

At stage 820, the method 800 includes determining, based on the first multi-source position information, second multi-source position information corresponding to the second UE. For example, the processor 510, e.g., the location determination unit 550, may determine second position information based on the first position information, e.g., by calculating one or more locations based on one or more measurements and/or one or more ranges and/or one or more locations indicated in the first position information. The location determination unit 550 may combine different portions of the first position information, e.g., combining measurements and/or ranges from multiple sources regarding the same UE to determine a location of that UE. The processor 510, possibly in combination with the memory 530, may comprise means for determining the second multi-source position information.

At stage 830, the method 800 includes identifying a third UE, separate from the first UE, to which the second multi-source position information is relevant. For example, the migration unit 560 may analyze present and/or future locations of UEs (e.g., based on one or more velocities and/or one or more indicated future locations) to determine a third UE for which the second multi-source position information (e.g., the location(s) of one or more UEs) may be relevant, e.g., due to the third UE being proximate, e.g., within a threshold distance and/or in a same geographic area (now and/or in the future), of one or more second UEs. The migration unit 560 may correspond with one or more other UEs (e.g., candidate UEs) to determine which other UE(s), if any, want the second multi-source position information, e.g., as discussed with respect to stage 740. The processor 510, possibly in combination with the memory 530 and/or the transceiver 520 (e.g., the antenna 246, the wireless transmitter 242, and the wireless receiver 244) may comprise means for identifying the third UE.

At stage 840, the method 800 includes sending migration information to the third UE, the migration information comprising an identifier of the second UE and comprising the first multi-source position information, or the second multi-source position information, or a combination thereof. For example, the migration unit 560 may send the UE ID and the location for each of one or more UEs that the primary UE 701 tracked. The migration unit 560 may send ID and location for all UEs tracked by the primary UE 701 or may send a subset of such information, e.g., the migration information determined to be relevant to the third UE (e.g., the secondary UE 702). The migration information may facilitate the migration of a virtual machine from UE to UE (or other entity). Which migration information is relevant may be determined, for example, based on present and/or future location of the third UE and/or present and/or future location(s) of the UE(s) of the migration information. For example, migration information may be passed to a UE that enters the environment 600 and does not yet have information as to, or from which can be determined, locations of the VRU UEs 621-623. This may help provide accurate location information for the VRU UEs 621-623 more quickly than can be obtained otherwise (e.g., calculated from measurements) which may help prevent a collision with a VRU UE, and thus a corresponding one of the VRUs 631-633 which may avoid injury to a VRU. Until a UE that enters the environment 600 (or other environment or relevant geographic area) receives the migration information (if ever), the UE may attempt to determine position information without assistance of the migration information (e.g., by measuring signals and determining position information from the measured signals and/or by receiving position information from other entities such as other UEs). The processor 510, possibly in combination with the memory 530, in combination with the transceiver 520 (e.g., the wireless transmitter 242 and the antenna 246) may comprise means for sending the migration information. Migration information may be passed to another UE even before the UE receiving the migration information is in an area of interest around a tracked UE.

Implementations of the method 800 may include one or more of the following features. In an example implementation, the method comprises making a relevance cessation determination that the first UE is ceasing, has ceased, or is expected to cease meeting one or more relevance criteria associated with the second UE, wherein the migration information is sent to the third UE in response to the relevance cessation determination. For example, the migration unit 560 determines that the primary UE 701 has left, is leaving, or will be leaving a region relevant to one or more UEs (e.g., leaving a radius of the VRU UE 704, or changing away from an intercept course with another UE, etc.). The processor 510, possibly in combination with the memory 530, may comprise means for making the relevance cessation determination. In another example implementation, the one or more relevance criteria comprise a geographic area presently containing the second UE or expected to contain the second UE in the future. In another example implementation, the geographic area has a perimeter defined relative to the second UE. For example, the geographic area could be a circle, a square, a rectangle, or other shape containing the second UE (e.g., centered about the second UE). In another example implementation, the one or more relevance criteria comprise a range from the first UE to the second UE. The range from the first UE (e.g., the primary UE 701) may be a present range or a future range (e.g., to the secondary VRU UE 704).

Also or alternatively, implementations of the method 800 may include one or more of the following features. In an example implementation, the third UE is identified based on a first relative location of the second UE and the third UE, or a second relative location of the first UE and the third UE, or a combination thereof. For example, the secondary UE 702 may be identified by the primary UE 701 as a UE to receive the migration information (e.g., the secondary UE 702) based on the VRU UE 704 and the secondary UE 702 being LOS (i.e., having an LOS relationship), based on the secondary UE 702 and the VRU UE 704 being within a threshold range of each other, based on the secondary UE 702 and the VRU UE 704 being proximate to (e.g., within a threshold range of) a common physical feature, e.g., a road, and/or based on another relative location. In another example implementation, the third UE is identified based on an expected relative location of the first UE and the third UE. For example, the secondary UE 702 may be identified by the primary UE 701 based on a predicted future range between the primary UE 701 and the secondary UE 702 and/or based on a predicted future location of the primary UE 701 and the secondary UE 702 relative to a geographic feature such as a road, and/or based on one or more other expected relative locations. In another example implementation, the method comprises sending, from the first UE, a request for interest in receiving the virtual machine, where the third UE is identified based on a response from the third UE to the request. For example, the primary UE 701 may send the request(s) 741, 742 to the secondary UE(s) 702, 703 and identify the UE to receive the migration information based on the response 743. The processor 510, possibly in combination with the memory 530, and the transceiver 520 (e.g., the antenna 246, the wireless transmitter 242, and the wireless receiver 244) may comprise means for identifying the third UE. In another example implementation, determining the second multi-source position information comprises combining different portions of the first multi-source position information using a virtual machine. In another example implementation, the migration information comprises: the second multi-source position information and a confidence in the section multi-source position information; or a velocity of the second UE; or a signal reception history of signals received from the second UE; or a location history of the second UE; or a combination thereof. Thus, the migration information may include, for example, UE location(s), confidence(s) in the UE location(s), velocity, signal reception history, and/or UE location history (e.g., of the VRU UE 704 and/or one or more other UEs).

IMPLEMENTATION EXAMPLES

Implementation examples are provided in the following numbered clauses.

1. A method for centralized device tracking, the method comprising:

obtaining, at a first UE from multiple sources, first multi-source position information corresponding to a second UE;

determining, based on the first multi-source position information, second multi-source position information corresponding to the second UE;

identifying a third UE, separate from the first UE, to which the second multi-source position information is relevant; and sending migration information to the third UE, the migration information comprising an identifier of the second UE and comprising the first multi-source position information, or the second multi-source position information, or a combination thereof.

2. The method of clause 1, further comprising making a relevance cessation determination that the first UE is ceasing, has ceased, or is expected to cease meeting one or more relevance criteria associated with the second UE, wherein the migration information is sent to the third UE in response to the relevance cessation determination.

3. The method of clause 2, wherein the one or more relevance criteria comprise a geographic area presently containing the second UE or expected to contain the second UE in the future.

4. The method of clause 3, wherein the geographic area has a perimeter defined relative to the second UE.

5. The method of clause 2, wherein the one or more relevance criteria comprise a range from the first UE to the second UE.

6. The method of clause 1, wherein the third UE is identified based on a first relative location of the second UE and the third UE, or a second relative location of the first UE and the third UE, or a combination thereof.

7. The method of clause 1, wherein the third UE is identified based on an expected relative location of the first UE and the third UE.

8. The method of clause 1, further comprising sending, from the first UE, a request for interest in receiving the migration information, wherein the third UE is identified based on a response from the third UE to the request.

9. The method of clause 1, wherein determining the second multi-source position information comprises combining different portions of the first multi-source position information using a virtual machine.

10. The method of clause 1, wherein the migration information comprises:

the second multi-source position information and a confidence in the second multi-source position information; or a velocity of the second UE; or a signal reception history of signals received from the second UE; or a location history of the second UE; or a combination thereof.

11. A first UE (user equipment) comprising:

a transceiver;

a memory; and a processor communicatively coupled to the transceiver and the memory and configured to:

obtain, from multiple sources, first multi-source position information corresponding to a second UE;

determine, based on the first multi-source position information, second multi-source position information corresponding to the second UE;

identify a third UE, separate from the first UE, to which the second multi-source position information is relevant; and send migration information to the third UE, the migration information comprising an identifier of the second UE and comprising the first multi-source position information, or the second multi-source position information, or a combination thereof.

12. The first UE of clause 11, wherein the processor is configured to make a relevance cessation determination that the first UE is ceasing, has ceased, or is expected to cease meeting one or more relevance criteria associated with the second UE, and wherein the processor is configured to send the migration information to the third UE in response to the relevance cessation determination.

13. The first UE of clause 12, wherein the one or more relevance criteria comprise a geographic area presently containing the second UE or expected to contain the second UE in the future.

14. The first UE of clause 13, wherein the geographic area has a perimeter defined relative to the second UE.

15. The first UE of clause 12, wherein the one or more relevance criteria comprise a range from the first UE to the second UE.

16. The first UE of clause 11, wherein the processor is configured to identify the third UE based on a first relative location of the second UE and the third UE, or a second relative location of the first UE and the third UE, or a combination thereof.

17. The first UE of clause 11, wherein the processor is configured to identify the third UE based on an expected relative location of the first UE and the third UE.

18. The first UE of clause 11, wherein the processor is configured to send a request for interest in receiving the migration information, and wherein the processor is configured to identify the third UE based on a response from the third UE to the request.

19. The first UE of clause 11, wherein the processor is configured to determine the second multi-source position information by combining different portions of the first multi-source position information by implementing a virtual machine.

20. The first UE of clause 11, wherein the processor is configured to send the migration information to a network entity in response to failure of the processor to identify the third UE or in response to failure of the processor to identify a static UE as the third UE.

21. The first UE of clause 11, wherein the migration information comprises:
the second multi-source position information and a confidence in the second multi-source position information; or
a velocity of the second UE; or
a signal reception history of signals received from the second UE; or
a location history of the second UE; or
a combination thereof.

22. A first UE (user equipment) comprising:
means for obtaining, from multiple sources, first multi-source position information corresponding to a second UE;
means for determining, based on the first multi-source position information, second multi-source position information corresponding to the second UE;
means for identifying a third UE, separate from the first UE, to which the second multi-source position information is relevant; and
means for sending migration information to the third UE, migration information comprising an identifier of the second UE and comprising the first multi-source position information, or the second multi-source position information, or a combination thereof.

23. The first UE of clause 22, further comprising means for making a relevance cessation determination that the first UE is ceasing, has ceased, or is expected to cease meeting one or more relevance criteria associated with the second UE, wherein the means for sending the migration information are for sending the migration information to the third UE in response to the relevance cessation determination.

24. The first UE of clause 23, wherein the one or more relevance criteria comprise a geographic area presently containing the second UE or expected to contain the second UE in the future.

25. The first UE of clause 24, wherein the geographic area has a perimeter defined relative to the second UE.

26. The first UE of clause 23, wherein the one or more relevance criteria comprise a range from the first UE to the second UE.

27. The first UE of clause 22, wherein the means for identifying the third UE are for identifying the third UE based on a first relative location of the second UE and the third UE, or a second relative location of the first UE and the third UE, or a combination thereof.

28. The first UE of clause 22, wherein the means for identifying the third UE are for identifying the third UE based on an expected relative location of the first UE and the third UE.

29. The first UE of clause 22, further comprising means for sending a request for interest in receiving the migration information, wherein the means for identifying the third UE are for identifying the third UE based on a response from the third UE to the request.

30. The first UE of clause 22, wherein the means for determining the second multi-source position information comprise means for combining different portions of the first multi-source position information using a virtual machine.

31. The first UE of clause 22, further comprising means for sending the migration information to a network entity in response to failure of the means for identifying the third UE to identify the third UE or in response to failure of the means for identifying the third UE to identify a static UE as the third UE.

32. The first UE of clause 22, wherein the migration information comprises:
the second multi-source position information and a confidence in the second multi-source position information; or
a velocity of the second UE; or
a signal reception history of signals received from the second UE; or
a location history of the second UE; or
a combination thereof.

33. A non-transitory, processor-readable storage medium of a first UE (user equipment) comprising processor-readable instructions to cause a processor of the first UE to:
obtain, from multiple sources, first multi-source position information corresponding to a second UE;
determine, based on the first multi-source position information, second multi-source position information corresponding to the second UE;
identify a third UE, separate from the first UE, to which the second multi-source position information is relevant; and
send migration information to the third UE, the migration information comprising an identifier of the second UE and comprising the first multi-source position information, or the second multi-source position information, or a combination thereof.

34. The storage medium of clause 33, further comprising processor-readable instructions to cause the processor to make a relevance cessation determination that the first UE is ceasing, has ceased, or is expected to cease meeting one or more relevance criteria associated with the second UE, wherein the processor-readable instructions to cause the processor to send the migration information comprise processor-readable instructions to cause the processor to send the migration information to the third UE in response to the relevance cessation determination.

35. The storage medium of clause 34, wherein the one or more relevance criteria comprise a geographic area presently containing the second UE or expected to contain the second UE in the future.

36. The storage medium of clause 35, wherein the geographic area has a perimeter defined relative to the second UE.

37. The storage medium of clause 34, wherein the one or more relevance criteria comprise a range from the first UE to the second UE.

38. The storage medium of clause 33, wherein the processor-readable instructions to cause the processor to identify the third UE comprise processor-readable instructions to cause the processor to identify the third UE based on a first relative location of the second UE and the third UE, or a second relative location of the first UE and the third UE, or a combination thereof.

39. The storage medium of clause 33, wherein the processor-readable instructions to cause the processor to identify the third UE comprise processor-readable instructions to cause the processor to identify the third UE based on an expected relative location of the first UE and the third UE.

40. The storage medium of clause 33, further comprising processor-readable instructions to cause the processor to send a request for interest in receiving the migration information, wherein the processor-readable instructions to cause the processor to identify the third UE comprise processor-readable instructions to cause the processor to identify the third UE based on a response from the third UE to the request.

41. The storage medium of clause 33, wherein the processor-readable instructions to cause the processor to determine the second multi-source position information comprise processor-readable instructions to cause the processor to combine different portions of the first multi-source position information using a virtual machine.

42. The storage medium of clause 33, further comprising processor-readable instructions to cause the processor to send the migration information to a network entity in response to failure to identify the third UE or in response to failure to identify a static UE as the third UE.

43. The storage medium of clause 33, wherein the migration information comprises:
the second multi-source position information and a confidence in the second multi-source position information; or
a velocity of the second UE; or
a signal reception history of signals received from the second UE; or
a location history of the second UE; or
a combination thereof.

Other Considerations

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

As used herein, the term RS (reference signal) may refer to one or more reference signals and may apply, as appropriate, to any form of the term RS, e.g., PRS, SRS, CSI-RS, etc.

As used herein, unless otherwise stated, a statement that a function or operation is "based on" an item or condition means that the function or operation is based on the stated item or condition and may be based on one or more items and/or conditions in addition to the stated item or condition.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. A method for centralized device tracking, the method comprising:
   obtaining, at a first user equipment (UE) from multiple sources, first multi-source position information corresponding to a second UE;
   determining, based on the first multi-source position information, second multi-source position information corresponding to the second UE;
   identifying a third UE, separate from the first UE, to which the second multi-source position information is relevant;
   sending migration information to the third UE, the migration information comprising an identifier of the second UE and comprising the first multi-source position information, or the second multi-source position information, or a combination thereof; and
   sending the migration information to a network entity in response to a failure to identify the third UE or in response to failure to identify a static UE as the third UE.

2. The method of claim 1, further comprising making a relevance cessation determination that the first UE is ceasing, has ceased, or is expected to cease meeting one or more relevance criteria associated with the second UE, wherein the migration information is sent to the third UE in response to the relevance cessation determination.

3. The method of claim 2, wherein the one or more relevance criteria comprise a geographic area presently containing the second UE or expected to contain the second UE in the future.

4. The method of claim 3, wherein the geographic area has a perimeter defined relative to the second UE.

5. The method of claim 2, wherein the one or more relevance criteria comprise a range from the first UE to the second UE.

6. The method of claim 1, wherein the third UE is identified based on a first relative location of the second UE and the third UE, or a second relative location of the first UE and the third UE, or a combination thereof.

7. The method of claim 1, wherein the third UE is identified based on an expected relative location of the first UE and the third UE.

8. The method of claim 1, further comprising sending, from the first UE, a request for interest in receiving the migration information, wherein the third UE is identified based on a response from the third UE to the request.

9. The method of claim 1, wherein determining the second multi-source position information comprises combining different portions of the first multi-source position information using a virtual machine.

10. The method of claim 1, wherein the migration information comprises:
    the second multi-source position information and a confidence in the second multi-source position information; or
    a velocity of the second UE; or a signal reception history of signals received from the second UE; or a location history of the second UE; or any combination of two or more thereof.

11. A first UE (user equipment) comprising:
a transceiver;
a memory; and
a processor communicatively coupled to the transceiver and the memory and configured to:
obtain, from multiple sources, first multi-source position information corresponding to a second UE;
determine, based on the first multi-source position information, second multi-source position information corresponding to the second UE;
identify a third UE, separate from the first UE, to which the second multi-source position information is relevant;
send migration information to the third UE, the migration information comprising an identifier of the second UE and comprising the first multi-source position information, or the second multi-source position information, or a combination thereof; and
send the migration information to a network entity in response to failure of the processor to identify the third UE or in response to failure of the processor to identify a static UE as the third UE.

12. The first UE of claim 11, wherein the processor is configured to make a relevance cessation determination that the first UE is ceasing, has ceased, or is expected to cease meeting one or more relevance criteria associated with the second UE, and wherein the processor is configured to send the migration information to the third UE in response to the relevance cessation determination.

13. The first UE of claim 12, wherein the one or more relevance criteria comprise a geographic area presently containing the second UE or expected to contain the second UE in the future.

14. The first UE of claim 13, wherein the geographic area has a perimeter defined relative to the second UE.

15. The first UE of claim 12, wherein the one or more relevance criteria comprise a range from the first UE to the second UE.

16. The first UE of claim 11, wherein the processor is configured to identify the third UE based on a first relative location of the second UE and the third UE, or a second relative location of the first UE and the third UE, or a combination thereof.

17. The first UE of claim 11, wherein the processor is configured to identify the third UE based on an expected relative location of the first UE and the third UE.

18. The first UE of claim 11, wherein the processor is configured to send a request for interest in receiving the migration information, and wherein the processor is configured to identify the third UE based on a response from the third UE to the request.

19. The first UE of claim 11, wherein the processor is configured to determine the second multi-source position information by combining different portions of the first multi-source position information by implementing a virtual machine.

20. The first UE of claim 11, wherein the migration information comprises:
the second multi-source position information and a confidence in the second multi-source position information; or
a velocity of the second UE; or
a signal reception history of signals received from the second UE; or
a location history of the second UE; or
any combination of two or more thereof.

21. A first UE (user equipment) comprising:
means for obtaining, from multiple sources, first multi-source position information corresponding to a second UE;
means for determining, based on the first multi-source position information, second multi-source position information corresponding to the second UE;
means for identifying a third UE, separate from the first UE, to which the second multi-source position information is relevant;
means for sending migration information to the third UE, migration information comprising an identifier of the second UE and comprising the first multi-source position information, or the second multi-source position information, or a combination thereof; and
means for sending the migration information to a network entity in response to failure of the means for identifying the third UE to identify the third UE or in response to failure of the means for identifying the third UE to identify a static UE as the third UE.

22. The first UE of claim 21, further comprising means for making a relevance cessation determination that the first UE is ceasing, has ceased, or is expected to cease meeting one or more relevance criteria associated with the second UE, wherein the means for sending the migration information are for sending the migration information to the third UE in response to the relevance cessation determination.

23. The first UE of claim 22, wherein the one or more relevance criteria comprise a geographic area presently containing the second UE or expected to contain the second UE in the future.

24. The first UE of claim 23, wherein the geographic area has a perimeter defined relative to the second UE.

25. The first UE of claim 22, wherein the one or more relevance criteria comprise a range from the first UE to the second UE.

26. A non-transitory, processor-readable storage medium of a first UE (user equipment) comprising processor-readable instructions to cause a processor of the first UE to:
obtain, from multiple sources, first multi-source position information corresponding to a second UE;
determine, based on the first multi-source position information, second multi-source position information corresponding to the second UE;
identify a third UE, separate from the first UE, to which the second multi-source position information is relevant;
send migration information to the third UE, the migration information comprising an identifier of the second UE and comprising the first multi-source position information, or the second multi-source position information, or a combination thereof; and
send the migration information to a network entity in response to failure to identify the third UE or in response to failure to identify a static UE as the third UE.

27. The storage medium of claim 26, further comprising processor-readable instructions to cause the processor to make a relevance cessation determination that the first UE is ceasing, has ceased, or is expected to cease meeting one or more relevance criteria associated with the second UE, wherein the processor-readable instructions to cause the processor to send the migration information comprise processor-readable instructions to cause the processor to send the migration information to the third UE in response to the relevance cessation determination.

28. The storage medium of claim 27, wherein the one or more relevance criteria comprise a geographic area presently containing the second UE or expected to contain the second UE in the future.

* * * * *